(12) United States Patent
Liu et al.

(10) Patent No.: US 12,151,392 B2
(45) Date of Patent: Nov. 26, 2024

(54) HIGH-FREQUENCY HOT-PRESSING CONTINUOUS AUTOMATIC PRODUCTION LINE FOR DIMENSIONAL BAMBOO TIMBERS, AND PRODUCTION METHOD THEREOF

(71) Applicant: International Center for Bamboo and Rattan, Beijing (CN)

(72) Inventors: Huanrong Liu, Beijing (CN); Benhua Fei, Beijing (CN); Xiubiao Zhang, Beijing (CN); Zehui Jiang, Beijing (CN); Changhua Fang, Beijing (CN); Xinxin Ma, Beijing (CN); Fujun Gao, Beijing (CN); Yan Yan, Beijing (CN)

(73) Assignee: International Center for Bamboo and Rattan, Beijing (CN)

( * ) Notice: Subject to any disclaimer, the term of this patent is extended or adjusted under 35 U.S.C. 154(b) by 506 days.

(21) Appl. No.: 17/498,713

(22) Filed: Oct. 11, 2021

(65) Prior Publication Data

US 2022/0111552 A1    Apr. 14, 2022

(30) Foreign Application Priority Data

Oct. 12, 2020    (CN) .......................... 202011083988.4

(51) Int. Cl.
| | | |
|---|---|---|
| *B27D 1/08* | (2006.01) | |
| *B27G 11/00* | (2006.01) | |
| (Continued) | | |

(52) U.S. Cl.
CPC ................ *B27D 1/08* (2013.01); *B27G 11/00* (2013.01); *B05C 1/0865* (2013.01); *B27D 1/04* (2013.01);
(Continued)

(58) Field of Classification Search
CPC ........ B32B 38/1816; B32B 38/181808; B32B 38/1858; B05C 1/0865; B27D 1/006; B27D 1/04; B27G 11/00
See application file for complete search history.

(56) References Cited

FOREIGN PATENT DOCUMENTS

| | | | |
|---|---|---|---|
| CN | 104941866 A | * | 9/2015 |
| CN | 105000370 A | | 10/2015 |

(Continued)

OTHER PUBLICATIONS

Machine translation of CN104941866 (Year: 2015).*

(Continued)

*Primary Examiner* — Scott W Dodds
(74) *Attorney, Agent, or Firm* — Cook Alex Ltd.

(57) ABSTRACT

High-frequency hot-pressing continuous automatic production lines for dimensional bamboo timbers, and production methods thereof are provided. The production line can include a clip-up store and feeding mechanism fixed with one end of a three-roller type gluing system. An other end of the three-roller type gluing system is fixed with one end of a system for loading, layer up and stacking non-glued bamboo sheets. The outer side edge of the system for loading, layer up and stacking non-glued bamboo sheets is connected to a front inner end of a plate stack conveying system. A high-frequency press and high-frequency generator system is located at a rear inner end of the system for loading, layer up and stacking non-glued bamboo sheets.

7 Claims, 14 Drawing Sheets

(51) Int. Cl.
    *B05C 1/08*     (2006.01)
    *B27D 1/04*     (2006.01)
    *B32B 37/10*     (2006.01)
    *B32B 37/12*     (2006.01)
    *B32B 38/18*     (2006.01)

(52) U.S. Cl.
    CPC ............... *B32B 37/10* (2013.01); *B32B 37/12* (2013.01); *B32B 38/1808* (2013.01); *B32B 38/1816* (2013.01); *B32B 38/1858* (2013.01)

(56) References Cited

FOREIGN PATENT DOCUMENTS

| | | | | |
|---|---|---|---|---|
| CN | 106965272 A | * | 7/2017 | |
| CN | 212241437 U | * | 12/2020 | |
| KR | 20170050641 A | * | 5/2017 | ............... B27D 1/04 |

OTHER PUBLICATIONS

Machine translation of CN106965272 (Year: 2017).*
Machine translation of KR20170050641 (Year: 2017).*
Machine translation of CN212241437 (Year: 2020).*

* cited by examiner

A-A

HIGH-FREQUENCY HOT-PRESSING CONTINUOUS AUTOMATIC PRODUCTION LINE FOR DIMENSIONAL BAMBOO TIMBERS, AND PRODUCTION METHOD THEREOF

CROSS REFERENCE TO RELATED APPLICATION(S)

This application claims the benefit and priority of Chinese Patent Application No. 202011083988.4 filed on Oct. 12, 2020, the disclosure of which is incorporated by reference herein in its entirety.

FIELD OF THE INVENTION

The present disclosure relates to the technical field of dimensional bamboo timber production lines, in particular, to vertical type high-frequency hot-pressing continuous automatic production lines for dimensional bamboo timbers, and production methods thereof.

At present, preparation units for bamboo laminated lumber and bamboo plywood are boards formed by dipping, layer up, and hot-pressing applied by a hot press on dimensional bamboo strips. The dimensional bamboo strips each have a dimension and bamboo slivers each with another dimension. The dimension is determined by length times width times thickness being equal to 2100 mm times 25 mm times 5 mm; and the other dimension is determined by length times width times thickness equal to 2100 mm times (15 to 25) mm times (1 to 5) mm. The conventional bamboo laminated lumber and bamboo plywood each have a dimension, where the dimension is determined by length times width equal to 2100 mm times 1220 mm. Several layers of boards are stacked in the same direction after their surfaces are processed to be flat, and are pressed and adhered into boards or squares with different thicknesses. During the production of this kind of scrimber, the performance of the hot press determines the product quality, the production capacity and the production cost, so the hot press is one of the key equipment for production and hot-pressing. However, equipment for vertical type high-frequency hot-pressing continuous production line for dimensional bamboo timbers in the market still has a variety of problems.

For example, in conveying equipment of an automatic production line for a manual pallet jack and a detecting method in a document granted announcement No. CN105000370A, conveying equipment with a turnover mechanism is used. A workpiece is placed into an accommodating space of a turnover shifting fork to realize pressing the workpiece against the turnover shifting fork, so that the workpiece is driven to turn over to a specified station, while the turnover shifting fork is turned over. A speed reduction device can vary a transmission ratio, increase an output torque and decrease the speed on the turnover mechanism and a chain plate conveying line. In combination with a detection sensor, effective control in a workpiece conveying process is achieved. The combination of a resetting sensing plate and a resetting sensor realizes a function that the plate chain conveying line and the turnover mechanism can be successfully reset in case of accident interruption of power supply during normal operation. However, a constitutional unit has a relatively small size, so that a layer up process mainly relies on manual layer up, which is complicated, labor intensive, and large in gluing amount. A single-layer or multi-layer horizontal type hot press is used to perform up pressing on the surfaces of plate blank. Vertically spliced bamboos laminated lumber is pressed simultaneously by means of up pressing and lateral pressure. Hot oil heats upper and lower press plates to heat the plate blanks, so that glue is cured to prepare a board. However, a conventional heating press that uses hot oil to heat upper and lower press plates is only applicable to a board with a thickness less than 30 mm. As the thickness increases, the heating time is prolonged. Furthermore, there occurs a phenomenon that the surface is gelatinized while glue at a core layer is not cured completely. Hence, a high-frequency hot-pressing continuous automatic production line for dimensional bamboo timbers is provided to solve the above-mentioned problem.

SUMMARY OF THE INVENTION

In order to overcome the shortcomings of the prior art, the present disclosure provides a high-frequency hot-pressing continuous automatic production line for dimensional bamboo timbers, and a production method thereof. A two-in-one layer up and discharging system realizes automatic gluing and layer up of bamboo sheets. Bamboo cells that are warped, deformed, and difficult to realize automatic processing are processed to bamboo flattened plates through an automatic supply system, an automatic gluing system, a layer up system, a feeding system, a high-frequency hot-pressing system, an automatic discharging system, and other systems. Then, the bamboo flattened plates are processed into normalized and standardized dimension lumbers that are easy for subsequent processing.

In order to solve the above-mentioned technical problems, the present disclosure provides the following technical solutions. A high-frequency hot-pressing continuous automatic production line for dimensional bamboo timbers is provided. The continuous automatic production line comprising a clip-up store and feeding mechanism, wherein the clip-up store and feeding mechanism is fixed with one end of a three-roller type gluing system; another end of the three-roller type gluing system is fixed with one end of a system for loading, layer up and stacking non-glued flattened bamboo sheets; an outer side edge of the system for loading, layer up and stacking non-glued flattened bamboo sheets is connected to a front inner end of a plate stack conveying system; a high-frequency press and high-frequency generator system is located at a rear end of the plate stack conveying system.

In some preferred embodiments, the clip-up store and feeding mechanism includes a pushing cylinder, a pushing stand, a pushing push head, a clip-up store device and a single-piece discharging baffle plate; the pushing cylinder is fixed on a rear part of the pushing stand; one end of the pushing cylinder is fixed with the pushing push head; the clip-up store device is fixed on the pushing stand; an end part of the pushing stand is fixed with the single-piece discharging baffle plate; the pushing stand is a flat-plate type pushing stand; a lower end of the pushing stand is provided with two supporting legs; each of lower ends of the two supporting legs is fixed to a corresponding one of middle parts of horizontal leveling plates; two ends of each of the leveling plates are screwed with leveling bolts; the clip-up store device is located at an upper part of the pushing stand; a plurality of stop pillars are arranged side by side on two side edges of the clip-up store device at intervals; a width between transversely adjacent two of the stop pillars is greater than a width of each of dimensional bamboo strips by 1 to 2 mm; each of the stop pillars has a height of 0.6 m to 0.8 m; and a bottom of the clip-up store device is half opened.

In some preferred embodiments, the three-roller type gluing system includes a driving motor, a driving motor decelerator, an active rubber roller, a plurality of workpiece height adjustment devices, a gluing roller, a plurality of glue placement regions, a glue amount adjustment roller, a plurality of gluing amount adjustment devices, a glue collection box, a chain leaning wheel, a chain tensioning wheel, a tensioning spring, and a transmission chain; one side of a stand is provided with the driving motor; the driving motor decelerator is fixed on the driving motor; an output end of the driving motor drives an input end of the driving motor decelerator; an output end of the driving motor decelerator drives one end of a center shaft of the active rubber roller located at an inner lower part of the stand; the center shaft of the active rubber roller is connected to the stand through a bearing; an other end of the center shaft of the active rubber roller is located outside the stand and fixed with a transmission chain wheel; an inside of a portion of the stand which is above the active rubber roller is provided with the gluing roller; a portion of the stand which is at two sides of the gluing roller is provided with the workpiece height adjustment devices; a center shaft that is penetrated through two sides of the gluing roller is in shaft connection with the stand by the workpiece height adjustment devices; the glue amount adjustment roller is located on an upper portion of the stand which is opposite to the gluing roller; a portion of the stand which is at two sides of the glue amount adjustment roller is provided with the gluing amount adjustment devices capable of adjusting a distance between the glue amount adjustment roller and the gluing roller; the two sides of the glue amount adjustment roller are in shaft connection with the stand by the gluing amount adjustment devices; the glue placement regions are provided on two side portions of the stand which are above the gluing roller and the glue amount adjustment roller; and the glue collection box is placed in a portion of the stand which is beneath the active rubber roller and the glue amount adjustment roller; the center shaft of the gluing roller and a center shaft of the glue amount adjustment roller which are outside the stand are fixed with each one transmission chain wheel, wherein the center shaft of the gluing roller and the center shaft of the glue amount adjustment roller are corresponding to the transmission chain wheel of the center shaft of the active rubber roller; the transmission chain wheel of the gluing roller, the transmission chain wheel of the glue amount adjustment roller, and the transmission chain wheel of the active rubber roller are each wound with the transmission chain; the transmission chain is further wound on the chain leaning wheel and the chain tensioning wheel located on the stand; the chain tensioning wheel presses against the transmission chain through the tensioning spring; and a surface of the gluing roller is a ring-ripple rubber surface. two sides of the stand, where the workpiece height adjustment devices are corresponding to the gluing roller, are provided with respective opened sliding chutes each having an upward opening; middle parts of close plate blocks are screwed with respective lifting screws; each of the close plate blocks closes the upward opening of each of the opened sliding chutes and is fixed with the stand as a whole; two ends of each of sliding blocks are slidably fitted in a corresponding one of the opened sliding chutes; middle parts of the sliding blocks are provided with respective bearing holes; an upper part of each of the sliding blocks is in shaft connection with a lower end of a corresponding one of the lifting screws; an upper end of each of the lifting screws is fixed with a turntable; and the center shaft that is penetrated through the two sides of the gluing roller is arranged in a corresponding one of the bearing holes of the sliding blocks In some preferred embodiments, the system for loading, layer up and stacking non-glued flattened bamboo sheets includes a outerside-of-bamboo loading platform, a loading-and-unloading-device driving motor, a vacuum loading system, a discharging stand, a clamp type unloading device, a power transmission roller rack, a stacking platform, a conveying-roller-rack driving motor, a conveying roller rack, a vacuum generator, a vacuum chuck, a vacuum-system lifting cylinder, a vacuum-loading-system driving motor, a T-shaped screw rod, a lifting running wheel, a cross type lifting supporting arm, a vacuum-loading-system upper tabletop, a plurality of anti-toppling shafts, a synchronous belt, synchronous-belt wheels, a chain, a plurality of conveying flat belts, a plurality of stacking-platform driving motors, an unloading clamp type cylinder, and a clamp type unloading driving cylinder; the stacking platform is fixed on a left side of the conveying roller rack; the outerside-of-bamboo loading platform is fixed on a right side of the conveying roller rack; the power transmission roller rack is fixed on the conveying roller rack; a plurality of rolling drums are longitudinally provided on the power transmission roller rack at intervals; the conveying-roller-rack driving motor is provided beneath the conveying roller rack; a transmission chain wheel is fixed on the conveying-roller-rack driving motor; two ends of a rotating optical shaft with a chain wheel are connected to the conveying roller rack through shaft seats; the transmission chain wheel drives the rotating optical shaft to rotate through the chain and a chain wheel of the transmission chain; the rotating optical shaft is provided with the conveying flat belts for driving the plurality of rolling drums to synchronously rotate; an upper end of the conveying roller rack is provided with the discharging stand; the loading-and-unloading-device driving motor is fixed on a right side edge of the discharging stand; an output shaft of the loading-and-unloading-device driving motor is fixed with one of the two synchronous-belt wheels; another one of the two synchronous-belt wheels 320 is connected on a left side edge of the discharging stand; the synchronous belt is sleeved between the two synchronous-belt wheels; the discharging stand is slidably fitted with the vacuum loading system and the clamp type unloading device from right to left at intervals; the synchronous belt drives the vacuum loading system and the clamp type unloading device to move left and right along a lower end of the discharging stand; the vacuum generator is arranged on the vacuum loading system; a bottom end of the vacuum loading system is provided with the vacuum chuck; the vacuum loading system is provided with the vacuum-system lifting cylinder; the clamp type unloading driving cylinder is fixed on the clamp type unloading device; and the unloading clamp type cylinder is fixed at a bottom end of the clamp type unloading device; the vacuum-loading-system driving motor is fixed on one side of the outerside-of-bamboo loading platform; the outerside-of-bamboo loading platform is in shaft connection with the T-shaped screw rod driven by the vacuum-loading-system driving motor; the cross type lifting supporting arm is arranged on the outerside-of-bamboo loading platform; a lower outer side of the cross type lifting supporting arm is in shaft connection with one side edge of the outerside-of-bamboo loading platform; a moving block that is screwed with the T-shaped screw rod is fixed on an inner side of a lower end of the cross type lifting supporting arm; a lower end of the moving block is provided with a lifting running wheel capable of running on the outerside-of-bamboo loading platform; two sides of an upper end of the cross type lifting supporting arm are respectively in shaft connection with two sides of a lower end surface of the vacuum-loading-system upper tabletop; the anti-toppling shafts are fixed on two side edges of the outerside-of-bamboo loading platform at intervals; two side edges of the vacuum-loading-system upper tabletop which are provided with the anti-toppling shafts are provided with a plurality of strip-shaped through holes; and each of upper parts of the anti-toppling shafts passes through a corresponding one of the strip-shaped through holes; a limit baffle plate is provided at an upper end of a tail one of the rolling drums.

In some preferred embodiments, the plate stack conveying system includes a feeding push head device, a feeding stand, a feeding chain, a feeding platform, a plurality of anti-toppling devices, a feeding motor, a feeding chain wheel, an anti-toppling-device bracket, an alignment cylinder, and an alignment baffle plate; an upper outer side of a stand supporting column and a front end of the feeding stand that is transversely disposed are fixed with each other as a whole; a rear inner side of the feeding stand and a rear upper side of the feeding platform are fixed with each other as a whole; a front end of the feeding stand is provided with the feeding push head device; an upper end of the feeding push head device is slidably fitted to longitudinal rail wheels located on upper and lower end surfaces of the feeding stand through rail wheels; an upper end of the stand supporting column which is opposite to the rail wheels is in shaft connection with the feeding chain wheel; a rear end of the feeding stand which is opposite to the rail wheels is provided with a chain wheel driven by the feeding motor; the feeding chain wheel and the chain wheel that is driven by the feeding motor are wound with the feeding chain; an upper part of the feeding push head device is fixed on the feeding chain and is driven by the feeding chain; the feeding platform is located on the rear inner side of the feeding stand; an upper end of the feeding platform is provided with the anti-toppling devices that are disposed side by side at intervals; the feeding chain is located at an upper portion of middle space between the anti-toppling devices that are disposed side by side at intervals; the alignment cylinder is fixed at front ends of the anti-toppling devices; and the alignment baffle plate is arranged on the alignment cylinder; the rail wheels are each a semicircular grooved rail wheel, and have each a circular cross section; the feeding motor is fixed on a rear outer side of the feeding stand; bottom ends of the anti-toppling devices are fixed on the feeding platform; a front end surface of the feeding push head device is provided with a feeding push plate, and a front end surface of the feeding push plate is a rubber surface; the anti-toppling-device bracket is arranged at middle parts of both the feeding platform and the feeding stand.

In some preferred embodiments, the high-frequency press and high-frequency generator system includes a high-frequency generator, a high-frequency heating host, a plurality of upper pressing oil cylinders, a plurality of upper pressing push heads, a plurality of lateral pressing push heads, a positive electrode heating plate, a high-frequency conveying barrel, a positive electrode output aluminum-plate, a positive electrode insulation piece, and a plurality of lateral pressing oil cylinders; the high-frequency conveying barrel is fixed on the high-frequency generator; the positive electrode output aluminum-plate is arranged in the high-frequency conveying barrel; the positive electrode heating plate is arranged on one side surface of a lower inner part of the high-frequency heating host; the positive electrode heating plate is fixed with the high-frequency heating host through the positive electrode insulation piece; the positive electrode output aluminum-plate is connected with the positive electrode heating plate; the lateral pressing push heads are located on the high-frequency heating host opposite to the positive electrode heating plate; a portion of the high-frequency heating host which is at rear sides of the lateral pressing push heads is provided with the lateral pressing oil cylinders for driving the lateral pressing push heads to be close to the positive electrode heating plate; the high-frequency heating host is provided among the lateral pressing push heads and the positive electrode heating plate, and provided with the upper pressing push heads; and the upper pressing oil cylinders for pushing the upper pressing push heads to move downward are fixed on an upper portion of the high-frequency heating host, and are at top ends of the upper pressing push heads; each of the lateral pressing push heads is a rectangular steel plate; the lateral pressing oil cylinders that are disposed at intervals are fixed on a portion of the high-frequency heating host which is behind the lateral pressing push heads; ejection rods of the lateral pressing oil cylinders are fixed at respective middle parts of rear sides of the lateral pressing push heads; the positive electrode heating plate has a same shape as the lateral pressing push head; a sum of lengths of the upper pressing push heads is equal to a length of the positive electrode heating plate or a length of each of the lateral pressing push heads.

In some preferred embodiments, the upper pressing push heads are a plurality of independent strip-shaped press blocks that are longitudinally connected with each other end to end; the upper pressing oil cylinders that are disposed at intervals are fixed on a portion of the high-frequency heating host which is above middle parts of the upper pressing push heads; each of ejection rods of the pressure applying cylinders is in shaft connection with a middle part of an upper end of a corresponding one of the upper pressing push heads; and each of the upper pressing push heads is swung up and down along a corresponding one of the ejection rods at a swing angle of ±3 degrees.

A production method of a high-frequency hot-pressing continuous automatic production line for a dimensional bamboo timber can include the following steps.

In Step A, preparing the dimensional bamboo timbers by taking flattened bamboo sheets each having a dimension as a cell, wherein the dimension is determined by length times width times thickness equal to 1050 mm times 75 mm times 6.5 mm.

In Step B, putting a first stack of 60 pieces of the flattened bamboo sheets in the clip-up store device of the clip-up store and feeding mechanism in manner of keeping first innersides of bamboos of the first stack of the flattened bamboo sheets upward; driving a pushing push head by a pushing cylinder to push a bottommost one of the dimensional bamboo strips move forwards into the three-roller type gluing system for gluing.

In Step C, spreading glue by the three-roller type gluing system by using a roller coating method to uniformly spread the glue to one of the first innersides of bamboos which is on an upper surface of the bottommost one of the dimensional bamboo strips by drives of the active rubber roller and the gluing roller, at a gluing amount of 200 g/m$^2$; and enabling a glued surface of the bottommost one of the flattened bamboo sheets to move in manner of facing upward and enter onto rolling drums of a power transmission roller rack in a system for loading, layer up and stacking non-glued flattened bamboo sheets.

In Step D, placing a second stack of 60 pieces of the flattened bamboo sheets on an upper tabletop of a vacuum loading system in the system for loading, layer up and stacking non-glued flattened bamboo sheets in manner of keeping second innersides of bamboos of the second stack of the flattened bamboo sheets downward; and transferring a topmost one of the second stack of the flattened bamboo sheets on the upper tabletop of the vacuum loading system by vacuum chucks in the vacuum loading system onto glued surface of the bottommost one of the flattened bamboo sheets after being glued for layer up.

In Step E, placing an assembled dimensional-bamboo-timber mat on a stacking platform in the system for loading, layer up and stacking non-glued flattened bamboo sheets; enabling the stacking platform with an automatic lifting device to automatically descend down one layer, so as to keep an upper plane of the stacking platform and a surface of a next bottommost one of the first stack of 60 pieces of the dimensional bamboo sheets on a same plane after being glued, wherein the next bottommost one of the dimensional bamboo sheets is located on the rolling drums of the power transmission roller rack; repeating the layer up and in turn descending one layer, till a predetermined height of 600 mm;

In Step F, before an assembled mat stack with the height of 600 mm enters the high-frequency press and high-frequency generator system for drying, by the stacking platform in the system for loading, layer up and stacking non-glued flattened bamboo sheets, lifting the assembled mat stack to a same height as a feeding platform in the plate stack conveying system; driving an alignment baffle plate by an alignment cylinder in the plate stack conveying system to be in place; pushing the assembled mat stack on the stacking platform by a feeding push head device to the alignment baffle plate for alignment, such that front ends of mats in the assembled mat stack are ensured to be aligned; and conveying the assembled mat stack to a predetermined position of the high-frequency press and high-frequency generator system;

In Step G, pressing, heating and drying the assembled mat stack and another assembled mat stack each having another dimension in a squeezing and drying space of the high-frequency press and high-frequency generator system having a volume, through upper pressing push heads, a positive electrode heating plate and lateral pressing push heads, wherein the another dimension is determined by length times width times height equal to 1050 mm times 75 mm times 600 mm, the volume is length times width times height equal to 2600 mm times 100 mm times 600 mm; such that the glue in the mats to be pressed is quickly cured and molded, wherein each of the lateral pressing push heads has a stroke of 300 to 400 mm.

In Step H, performing high-frequency heating in a high-frequency press in a condition where a maximum system pressure is 14 MPa, a high-frequency generator has maximum input power of 40 kW, high-frequency maximum oscillation power is 30 kW, heating is conducted for 3 min, and cooling is conducted for 2 min.

In Step I, pushing out the assembled mat stack and the another assembled mat stack after being heated and cured; enabling an additional stack pushing device to have rear leaning grids and an upper pressing device, such that the assembled mat stack and the another assembled mat stack are prevented from being loosened or toppling over; pushing the assembled mat stack and the another assembled mat stack onto a lifting table; and pushing wholly the assembled mat stack and the another assembled mat stack onto a placement frame for placement when the mats are stacked to a predetermined number.

Preferably, the layer up includes: transferring the topmost one of the second stack of the flattened bamboo sheets on the upper tabletop of the vacuum loading system by the vacuum chucks in the vacuum loading system onto the glued surface of the bottommost one of the flattened bamboo sheets after being glued; enabling the topmost one of the second stack of the flattened bamboo sheets and the glued surface to be assembled into a whole, such that two of the dimensional bamboo timbers which are completely consistent dimensions are assembled into a single one of the mats.

Compared with the prior art, the present disclosure achieves beneficial effects as follows.

1. In the present disclosure, a high-frequency medium is applied to bamboo materials for the first time. Meanwhile, the preparation equipment for the dimensional bamboo timber is invented according to preparation characteristics and dimensional characteristics of a dimensional bamboo timber. The heating speed is high, the efficiency is high, and heating is uniform. Heat is generated from the inside of an object, which can make an object in an electromagnetic field uniformly to be heated, so as to effectively increase the curing speed of the glue and improve the product quality.

2. Through a system for automatic feeding and gluing, and a system of automatic layer up, the manpower and material costs are greatly reduced, the production efficiency is improved, and the processing time is shortened. The high-frequency hot press for bamboo materials overcomes the shortcomings that the electro discharge and the strike firing occur in a high-frequency medium heating technology used during heating of the bamboo materials, and a gluing temperature cannot be well controlled. So, the product quality is improved; and an automatic stacking mechanism wholly arranges a single set of two-in-one bamboo sheet, thereby improving the production efficiency. Furthermore, a heating process is easy to control.

DETAILED DESCRIPTION OF ILLUSTRATIVE EMBODIMENT(S)

Figure 1:
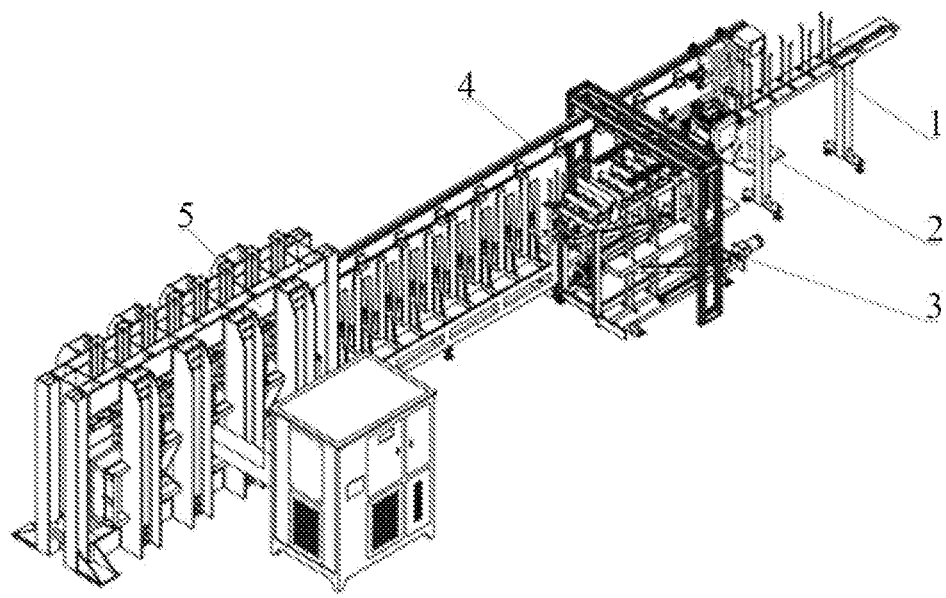
FIG. 1 is a schematic perspective diagram of overall equipment of a production line according to an embodiment of the present disclosure.

In order to make the technical means, creative features, objectives and effects of the present disclosure easy to understand, the following further describes the present disclosure in conjunction with specific embodiments, but the following embodiments are only preferred embodiments, rather than all embodiments, of the present disclosure. Based on the embodiments in the implementation modes, all other embodiments obtained by those skilled in the art without creative work shall fall within the scope of protection of the present disclosure. Experimental methods, circuits, program controllers, and related components controlled by the controllers in the following embodiments are all conventional methods unless otherwise specified. The materials, reagents, etc. used in the following embodiments can all be obtained commercially.

In embodiments, a high-frequency hot-pressing continuous automatic production line for dimensional bamboo timbers as shown in FIG. 1 to FIG. 20 includes clip-up store and feeding mechanism 1. Clip-up store and feeding mechanism 1 is fixed with one end of three-roller type gluing system 2. The other end of three-roller type gluing system 2 is fixed with one end of system for loading, layer up and stacking non-glued flattened bamboo sheets 3. The outer side edge of system for loading, layer up and stacking non-glued flattened bamboo sheets 3 is connected to a front inner end of plate stack conveying system 4. A high-frequency press and high-frequency generator system 5 is located at a rear end of the plate stack conveying system 4.

Figure 2:
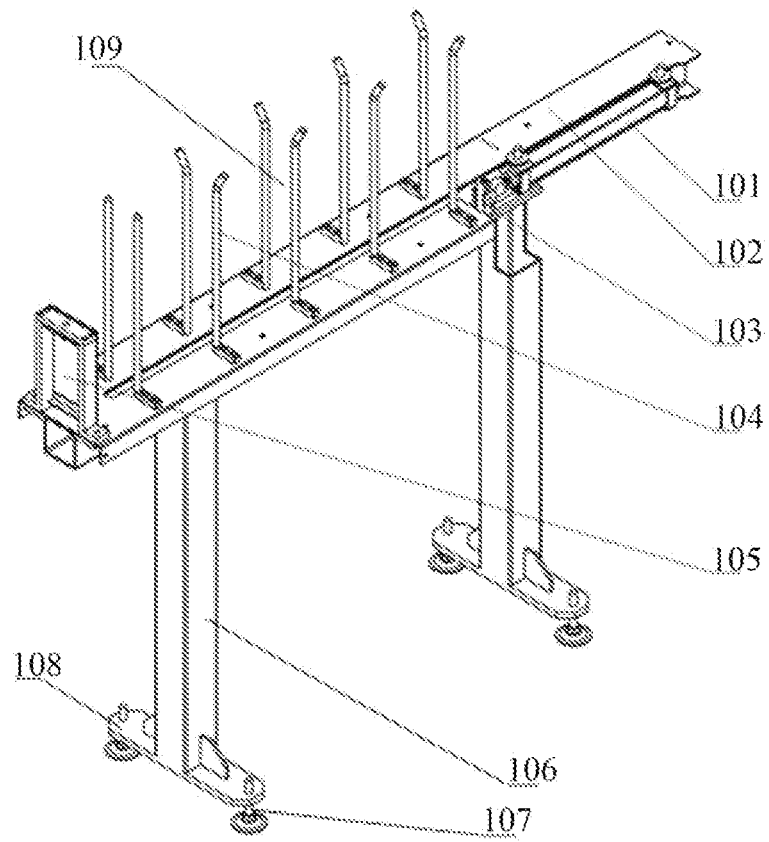
FIG. 2 is a schematic perspective diagram of a clip-up store and feeding mechanism according to an embodiment of the present disclosure.
Figure 3:
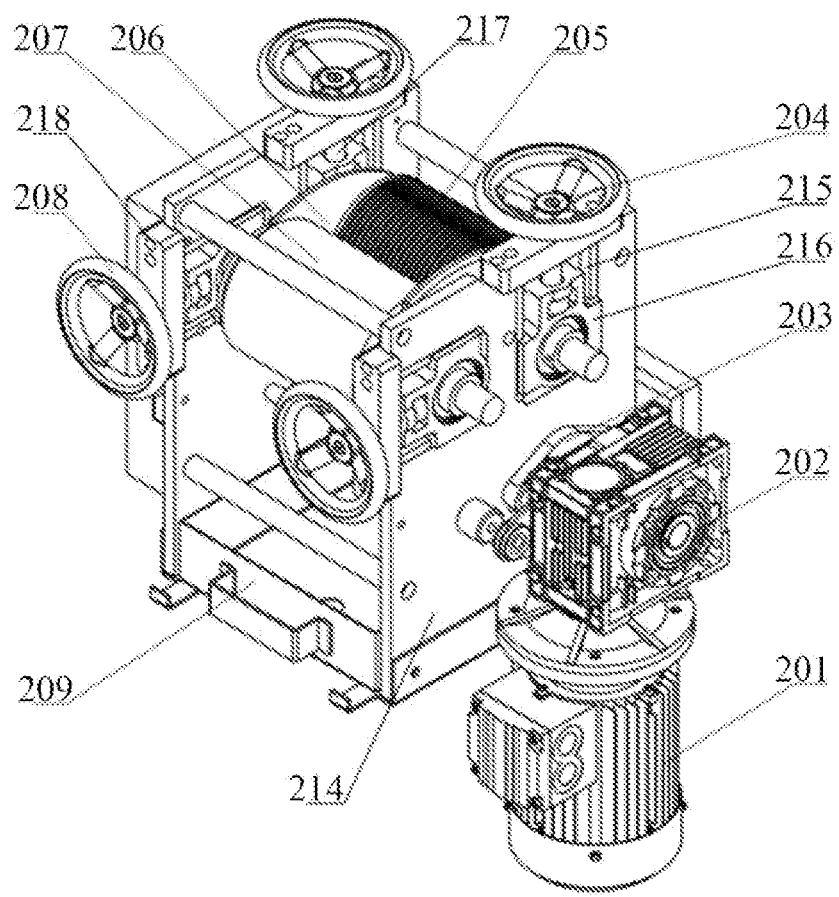
FIG. 3 is a schematic perspective diagram of a three-roller type gluing system according to an embodiment of the present disclosure.
Figure 4:
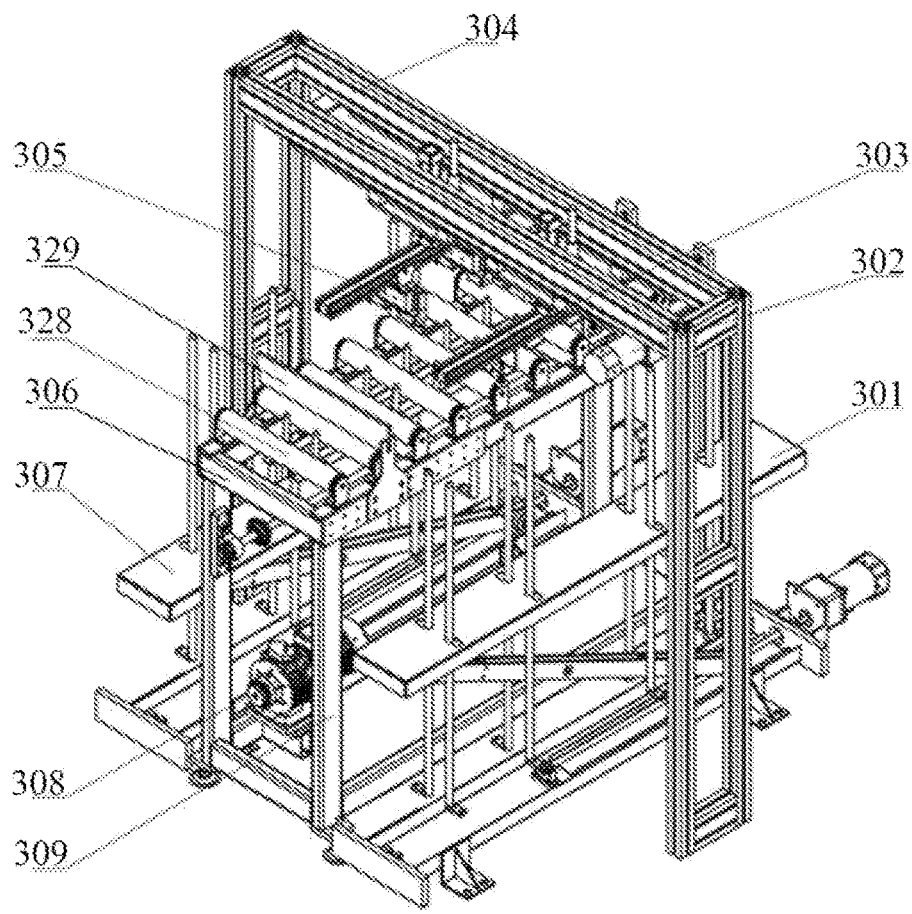
FIG. 4 is a schematic perspective diagram of a system for loading, layer up and stacking non-glued flattened bamboo sheets according to an embodiment of the present disclosure.
Figure 5:
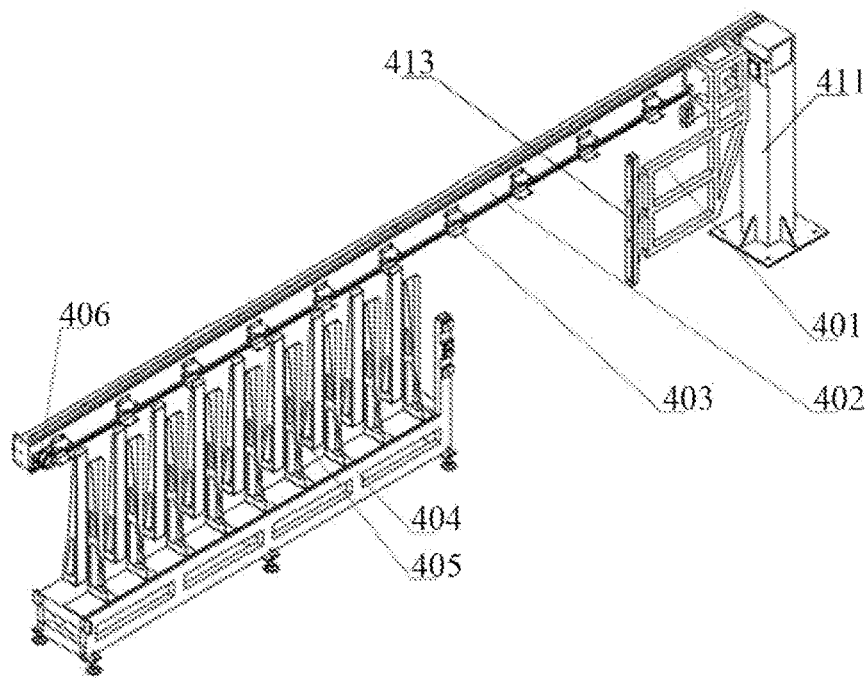
FIG. 5 is a schematic perspective diagram of a plate stack conveying system according to an embodiment of the present disclosure.
Figure 6:
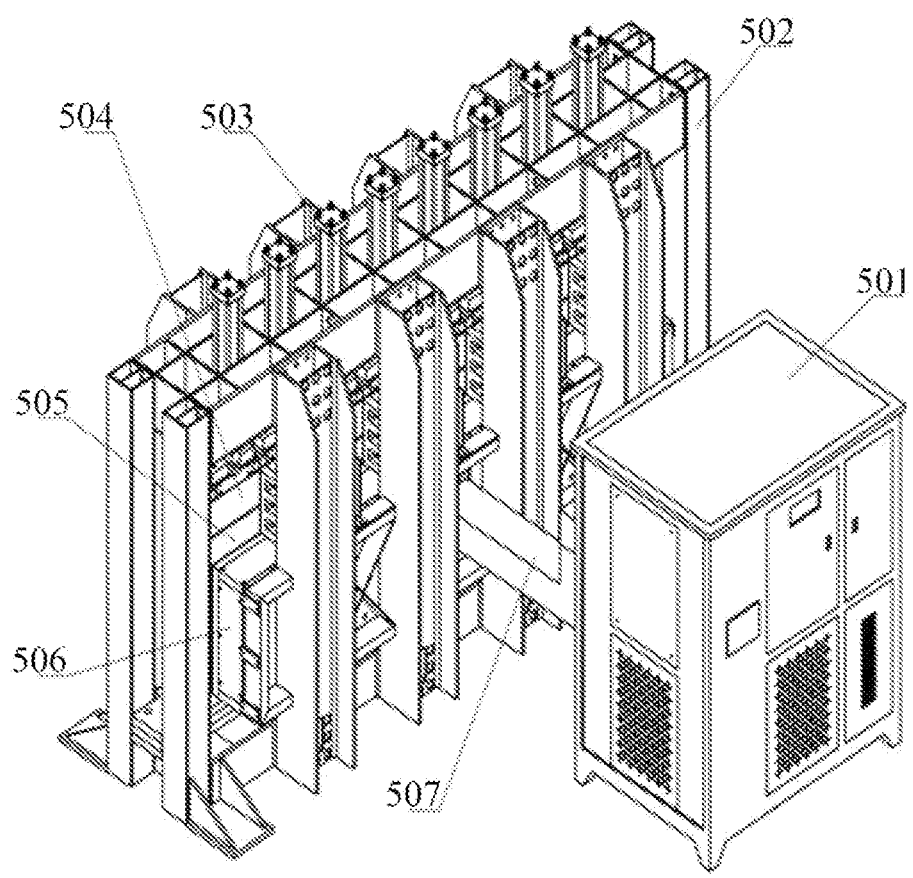
FIG. 6 is a schematic perspective diagram of a high-frequency press and high-frequency generator system according to an embodiment of the present disclosure.
Figure 7:
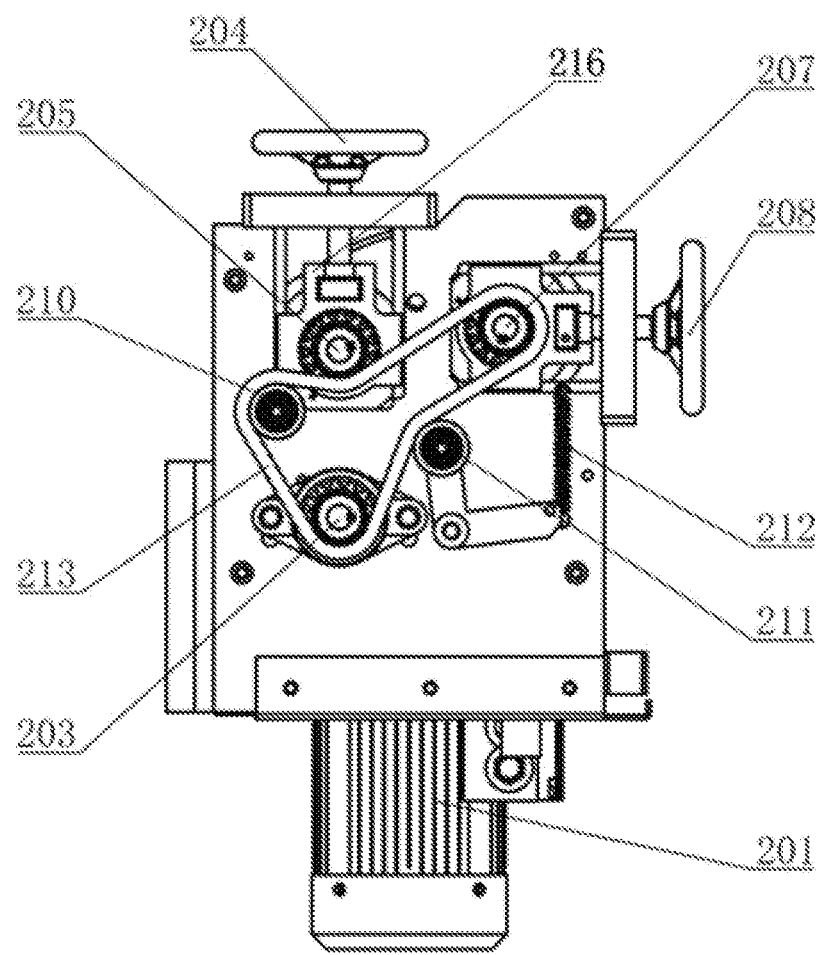
FIG. 7 is a front schematic diagram of a clip-up store and feeding mechanism according to an embodiment of the present disclosure.
Figure 8:
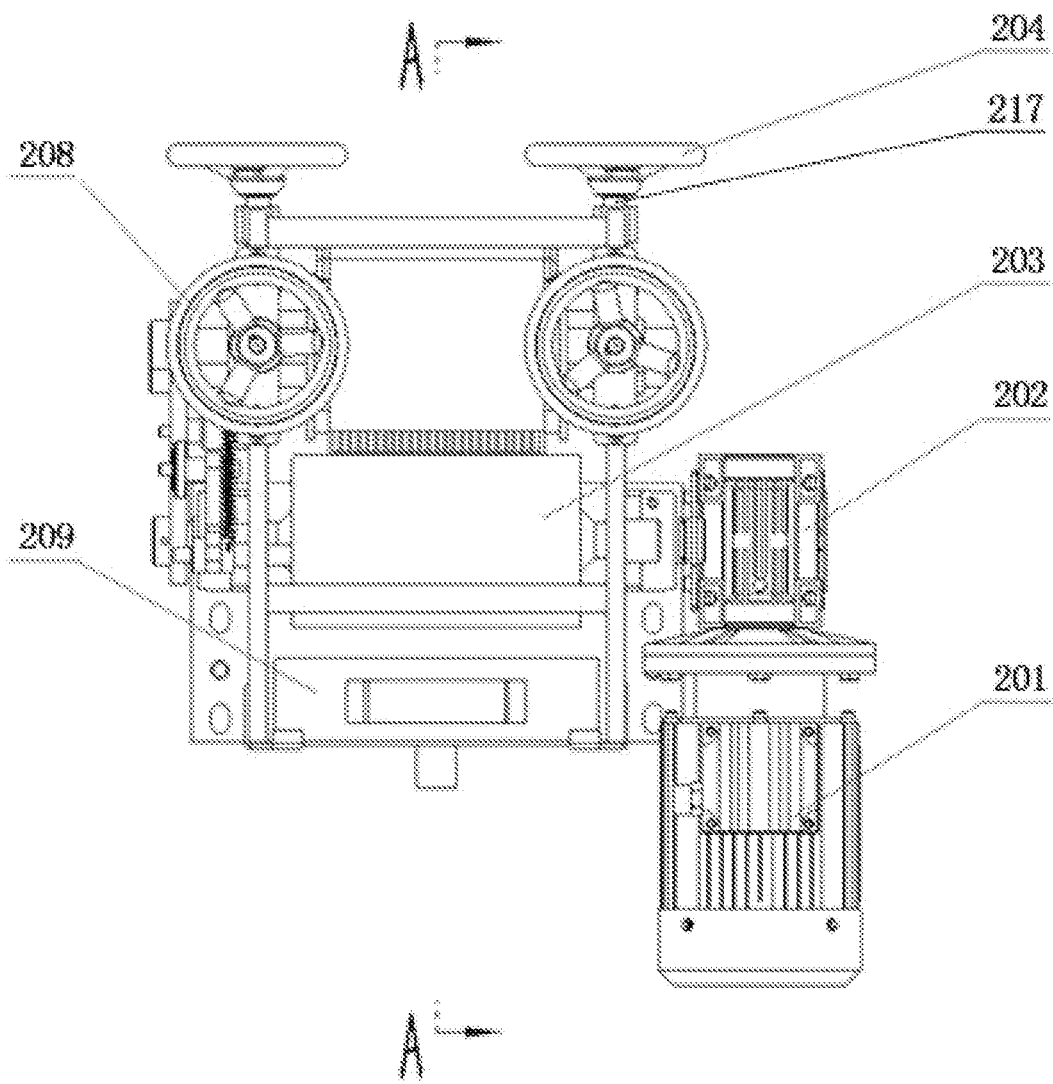
FIG. 8 is a side schematic diagram of a clip-up store and feeding mechanism according to an embodiment of the present disclosure.

As shown in FIG. 2, in optional embodiments, clip-up store and feeding mechanism 1 includes pushing cylinder 101, pushing stand 102, pushing push head 103, clip-up store device 109, and single-piece discharging baffle plate 105. The pushing cylinder is fixed on a rear part of the pushing stand. One end of the pushing cylinder is fixed with the pushing push head. The clip-up store device is fixed on the pushing stand. An end part of the pushing stand is fixed with the single-piece discharging baffle plate. Two sides of the single-piece discharging baffle plate are located on a portal frame. A lower end of the portal frame is fixed at the end part of the pushing stand. A gap between the lower end of the single-piece discharging baffle plate and an upper end surface, as well as the width of the portal frame can only allow a single normalized bamboo strip to pass through.

The pushing stand is a flat-plate type pushing stand. The lower end of the pushing stand is provided with two supporting legs 106. Each of the lower ends of the two supporting legs is fixed to a corresponding one of middle parts of horizontal leveling plates 108. Two ends of each of the leveling plate are screwed with leveling bolts 107. The leveling bolts are adjusted to keep the pushing stand in a horizontal state.

The clip-up store device is located at the upper part of the pushing stand. A plurality of stop pillars 104 are distributed side by side on two side edges of the clip-up store device at intervals. A width between transversely adjacent two stop pillars is greater than a width of each dimensional bamboo strip by 1 to 2 mm. The stop pillar has a height of 0.6 to 0.8 m. The bottom of the clip-up store device is half opened.

During usage, a stack of dimensional bamboo strips is put into clip-up store device 109 according to a principle that the innerside of bamboo is upward. The dimensional bamboo strips therein fall to the inner bottom of clip-up store device 109 by their gravities. Pushing cylinder 101 is initiated to drive pushing push head 103 to push the bottommost dimensional bamboo strip to move forward (the height of the pushing push head ensures that only one bamboo board is pushed). Single-piece discharging baffle plate 105 ensures that the dimensional bamboo strips can be discharged in manner of a single one piece. After pushing cylinder 101 extends out to be in place, i.e., after the single pushed dimensional bamboo strip is separated from the single-piece discharging baffle plate and enters active rubber roller of the three-roller type gluing system 2 in the next procedure, drawing back is carried out. Pushing push head 103 carries out the drawing back action under the drive of the pushing cylinder, so as to perform the feeding flow for the second time.

As shown in FIG. 3, and FIG. 7 to FIG. 9, in some optional embodiments, three-roller type gluing system 2 is located at a rear end of clip-up store and feeding mechanism 1. The three-roller type gluing system includes stand 214, driving motor 201, driving motor decelerator 202, active rubber roller 203, workpiece height adjustment devices 204, gluing roller 205, glue placement regions 206, glue amount adjustment roller 207, gluing amount adjustment devices 208, glue collection box 209, chain leaning wheel 210, chain tensioning wheel 211, tensioning spring 212, and transmission chain 213.

One side of stand 214 is provided with driving motor 201. Driving motor decelerator 202 is fixed on the driving motor. An output end of the driving motor drives an input end of the driving motor decelerator. An output end of the driving motor decelerator drives one end of a center shaft of active rubber roller 203 located at an inner lower part of the stand. The center shaft of the active rubber roller is connected to the stand through a bearing. The active rubber roller is fixed on its center shaft. Another end of the center shaft of the active rubber roller is located outside the stand, and fixed with a transmission chain wheel.

An inside of a portion of the stand which is above the active rubber roller is provided with gluing roller 205. A surface of the gluing roller is a ring-ripple rubber surface, so that the surface of the gluing roller is convenient for gluing and conveying the dimensional bamboo strips. A portion of the stand which is on both sides of the gluing roller is provided with workpiece height adjustment devices 204. A center shaft that is penetrated through both sides of the gluing roller is in shaft connection with the stand by the workpiece height adjustment devices.

Two sides of the stand, where workpiece height adjustment devices 204 are corresponding to the gluing roller, are provided with opened sliding chutes 215 with each an upward opening. The middle parts of close plate blocks 218 are screwed with respective lifting screws 217. The close plate block closes the upward opening of the opened sliding chute, and is fixed with the stand as a whole. Two ends of each of sliding blocks 216 are slidably fitted in a corresponding one of the opened sliding chutes. Middle parts of the sliding blocks are provided with respective bearing holes. An upper part of the sliding block is in shaft connection with a lower end of lifting screw 217. Upper ends of the lifting screws are fixed with turntables. The center shaft that is penetrated through both sides of the gluing roller is arranged in a corresponding one of the bearing holes of the sliding blocks. The turntables that are located on a portion of the stand, which is on both sides of the gluing roller, are rotated by hands, so as to respectively drive the two lifting screws, thereby enabling the two sliding blocks to drive the center shaft penetrated through both sides of the gluing roller. In this way, the gluing roller is enabled to rise up or drop down along the opened sliding chutes, thereby adjusting the gluing amount for the dimensional bamboo strip passing through the gluing roller and facilitating the conveyance of the dimensional bamboo strip.

Glue amount adjustment roller 207 is located on an upper part of the stand which is opposite to gluing roller 205. A portion of the stand which is at both sides of the glue amount adjustment roller is provided with gluing amount adjustment devices 208 capable of adjusting a distance between glue amount adjustment roller 207 and gluing roller 205. Two sides of the glue amount adjustment roller 207 are in shaft connection with the stand by gluing amount adjustment devices 208.

The structure of gluing amount adjustment device 208 is basically the same as the structure of workpiece height adjustment device 204, whereas a difference is that an opening of opened sliding chute 215 where the gluing amount adjustment device is located is backward. The other parts are the same, which are omitted. The turntables that are located on a portion of the stand which is on both sides of the glue amount adjustment roller are rotated by hands, so as to respectively drive the two lifting screws, thereby enabling the two sliding blocks to drive the center shaft penetrated through both sides of the glue amount adjustment roller. In this way, glue amount adjustment roller 207 is enabled to be close to press against gluing roller 205 along the opened sliding chutes; or to be separated the gluing roller 205 along the opened sliding chutes, so as to adjust the glue amount on the gluing roller. If a distance, which enables a surface of the glue amount adjustment roller to press against a surface of the gluing roller, is shorter, the less glue is spread to the dimensional bamboo strip.

Glue placement regions 206 are provided on two side portions of the stand which are above gluing roller 205 and glue amount adjustment roller 207. Glue collection box 209 is placed in a portion of the stand which is beneath active rubber roller 203 and the glue amount adjustment roller, so as to receive the glue falling from the active rubber roller and the glue amount adjustment roller.

The center shaft of gluing roller 205 and a center shaft of glue amount adjustment roller 207 which are outside the stand are fixed with each one transmission chain wheel, where the center shaft of the gluing roller and the center shaft of the glue amount adjustment roller are corresponding to the transmission chain wheel of the center shaft of the active rubber roller. The transmission chain wheel of the gluing roller, the transmission chain wheel of the glue amount adjustment roller, and the transmission chain wheel of the active rubber roller are each wound with transmission chain 213. By means of the transmission chain, the output end of the driving motor drives the input end of the driving motor decelerator, so as to enable the output end of the motor decelerator to drive the active rubber roller and the gluing roller to anticlockwise rotate, and to drive the glue amount adjustment roller to clockwise rotate.

Transmission chain 213 is also wound on chain leaning wheel 210 and chain tensioning wheel 211 which are located on the stand. The chain tensioning wheel is pressed against transmission chain 13 by means of tensioning spring 212 to ensure that the transmission chain effectively drives the transmission chain wheels.

Operation steps for enabling glue to evenly spread to the inner side of bamboo of the single piece of dimensional bamboo strip are as follows. The clip-up store and feeding mechanism supplies one end of the dimensional bamboo strip into active rubber roller 203. Under the drive of an active rubber roller driving motor, one end of the dimensional bamboo strip on active rubber roller 203 conveys the dimensional bamboo strip forwards through the rotations of active rubber roller 203 and gluing roller 205. The glue is placed in glue placement regions 206. During the process of conveying the dimensional bamboo strip forwards, the glue is uniformly spread to the inner side of bamboo of the upper surface of the dimensional bamboo strip through the drives of the active rubber roller and the gluing roller. The gluing amount is controlled by glue amount adjustment roller 207; and residual glue flows into glue collection box 209 for collecting glue. High-frequency glue is adopted. The three-roller type gluing device spreads the glue to the inner side of bamboo of the dimensional bamboo strip through the gluing roller in the continuous passing process of a dimensional bamboo strip cell. Then, the three-roller type gluing device conveys the dimensional bamboo strip onto rolling drums 328 of power transmission roller rack 306 of system for loading, layer up and stacking non-glued flattened bamboo sheets 3 in the next procedure.

Pushing push head 103 of the clip-up store and feeding mechanism in the previous procedure conveys the dimensional bamboo strip onto active rubber roller 203. A bamboo sheet is conveyed forward through the rotations of active rubber roller 203 and gluing roller 205. In the process of forward conveying the bamboo sheet, the gluing roller evenly spreads the glue to the upper surface of the bamboo sheet. The mixed glue is manually poured into glue placement regions 206. By means of adjusting a gap between gluing roller 205 and glue amount adjustment roller 207, the glue will not flow down by using the surface tension of the glue. However, the glue is just spread to the upper end surface of the bamboo sheet along gluing roller 205. The function of glue collection box 209 is to collect the redundant or residual glue (little) in the gluing process. In at least some embodiments, glue collection box 209 is manually cleaned every day. The three rollers are driven by the chains.

Figure 9:
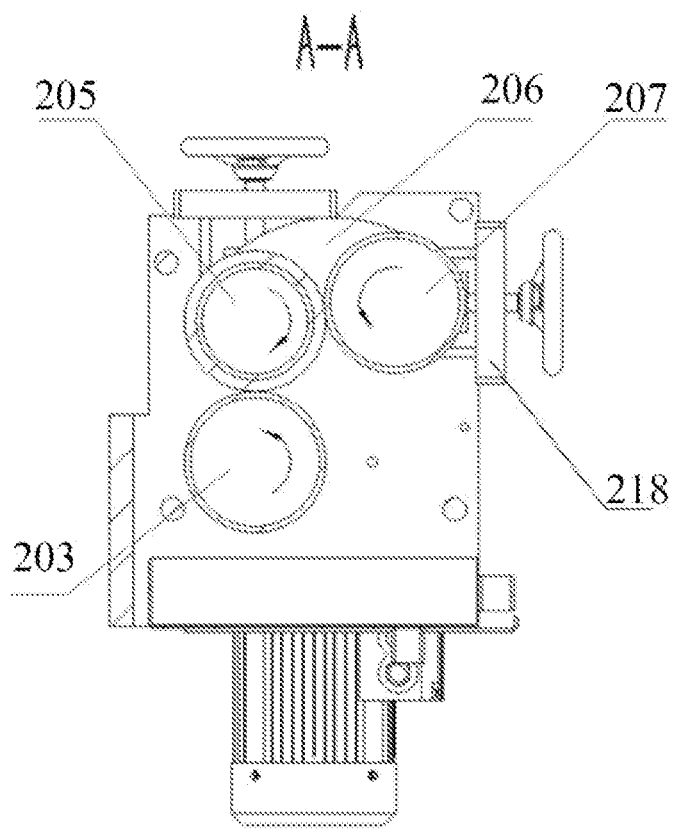
FIG. 9 is a front view of a clip-up store and feeding mechanism taken along line A-A according to an embodiment of the present disclosure.
Figure 10:
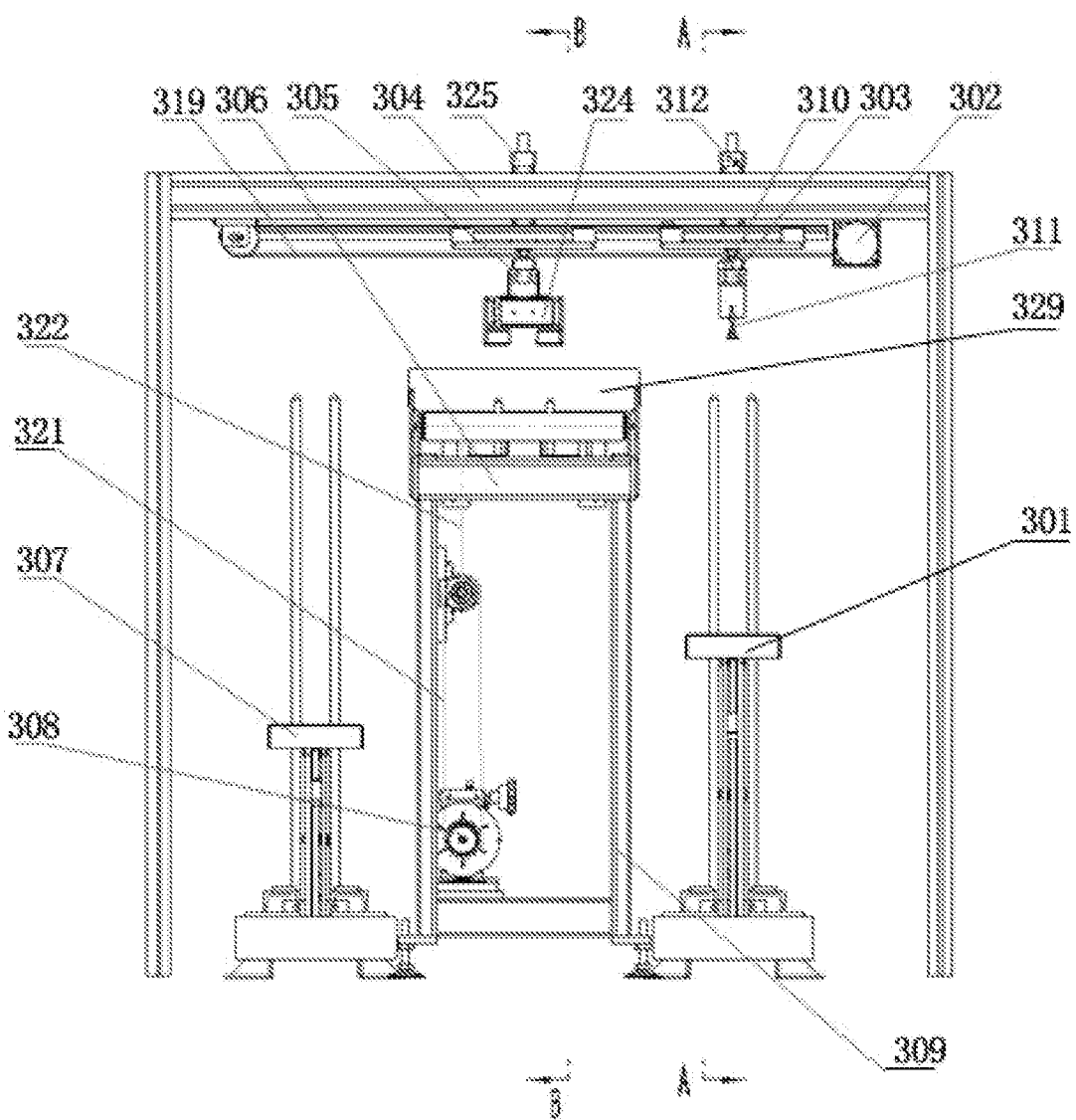
FIG. 10 is a front view of a system for loading, layer up and stacking non-glued flattened bamboo sheets according to an embodiment of the present disclosure.
Figure 11:
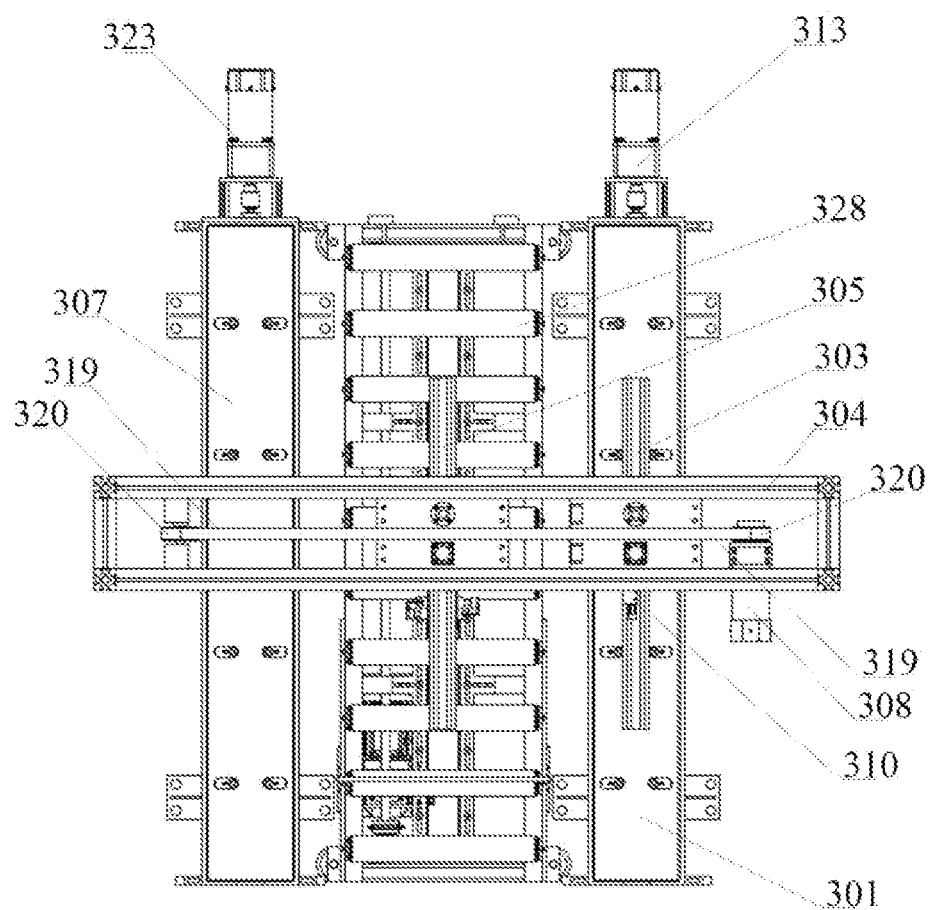
FIG. 11 is a top schematic diagram of the system for loading, layer up and stacking non-glued flattened bamboo sheets in FIG. 10 according to an embodiment of the present disclosure.
Figure 12:
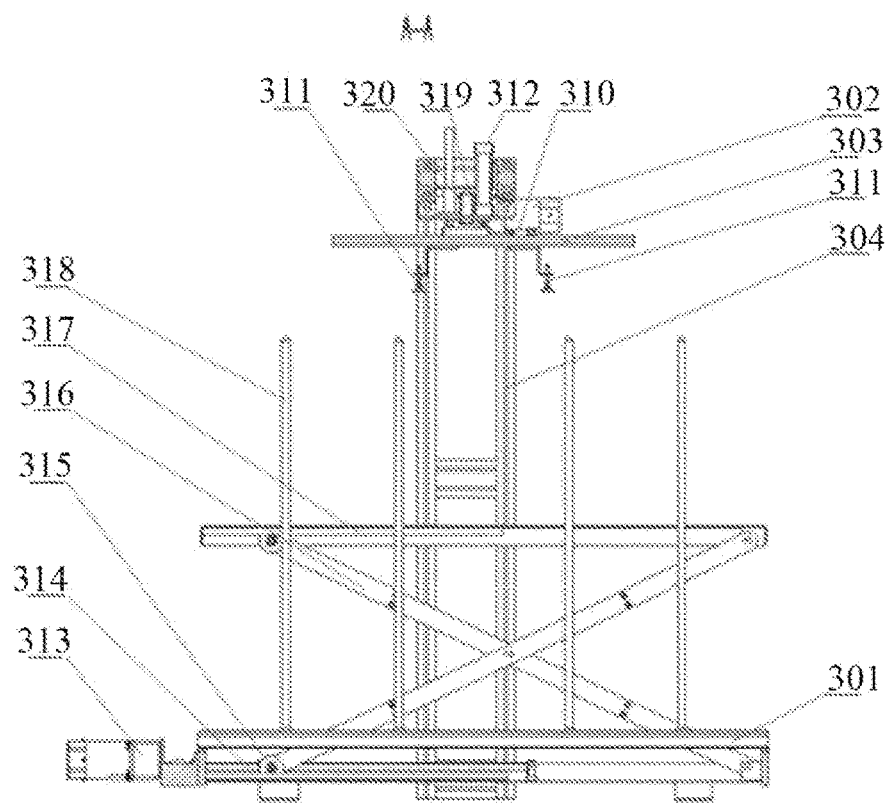
FIG. 12 is a side view taken along line A-A in FIG. 10 according to an embodiment of the present disclosure.
Figure 13:
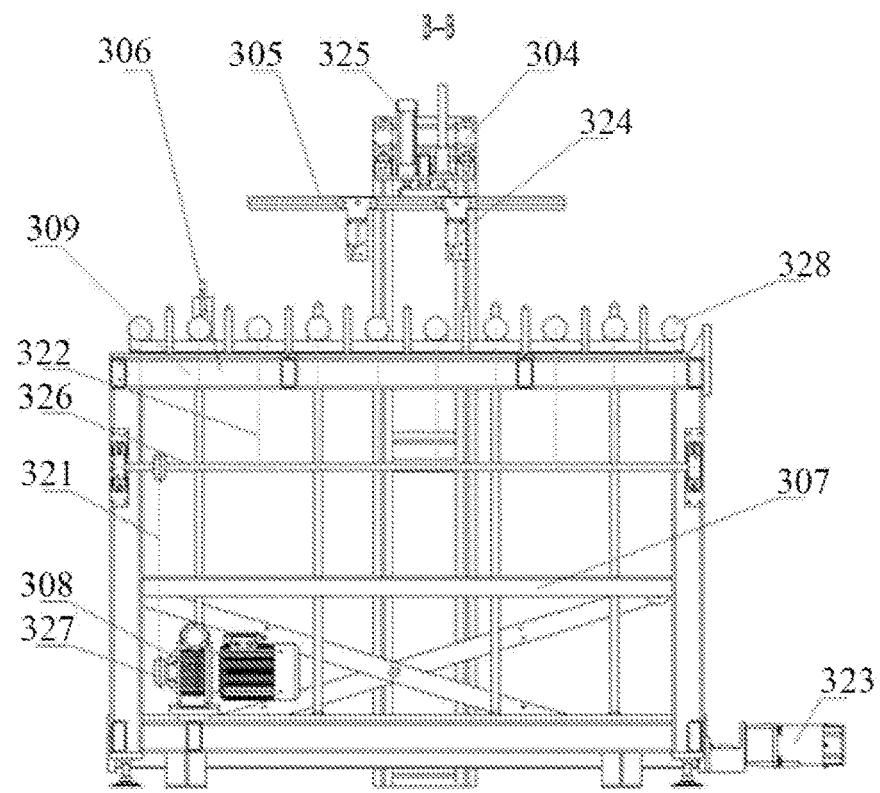
FIG. 13 is a side view taken along line B-B in FIG. 10 according to an embodiment of the present disclosure.
Figure 14:
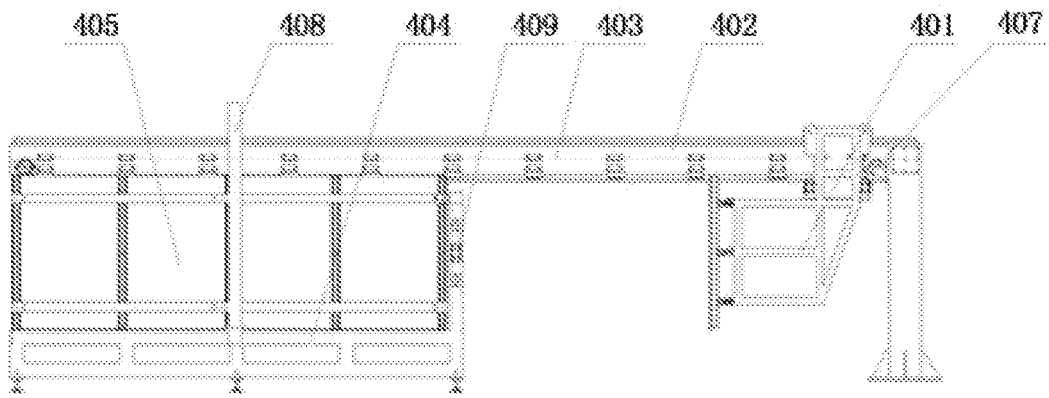
FIG. 14 is a front schematic diagram of a plate stack conveying system according to an embodiment of the present disclosure.
Figure 15:
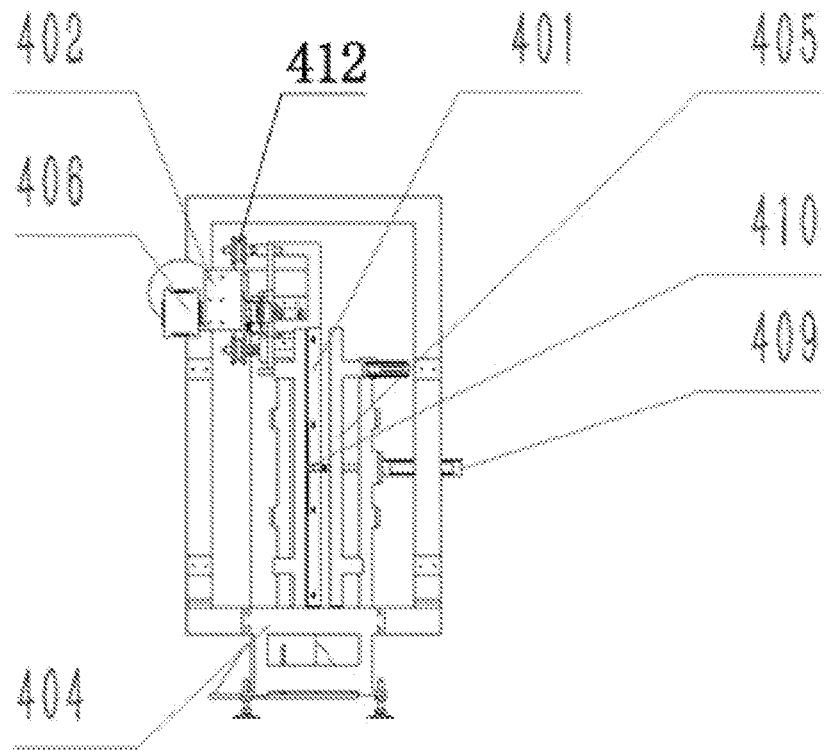
FIG. 15 is a side schematic diagram of a plate stack conveying system according to an embodiment of the present disclosure.
Figure 16:
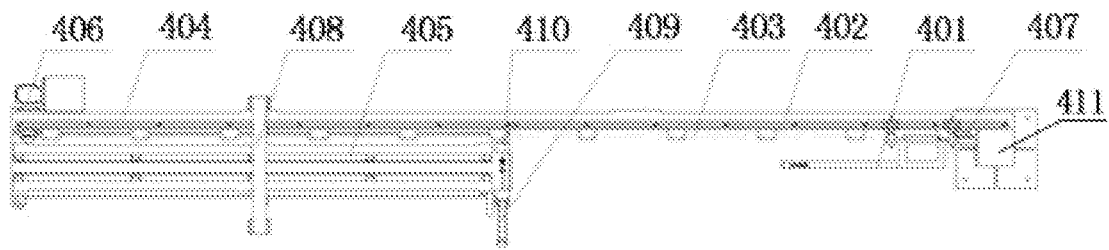
FIG. 16 is a top schematic diagram of a plate stack conveying system according to an embodiment of the present disclosure.
Figure 17:
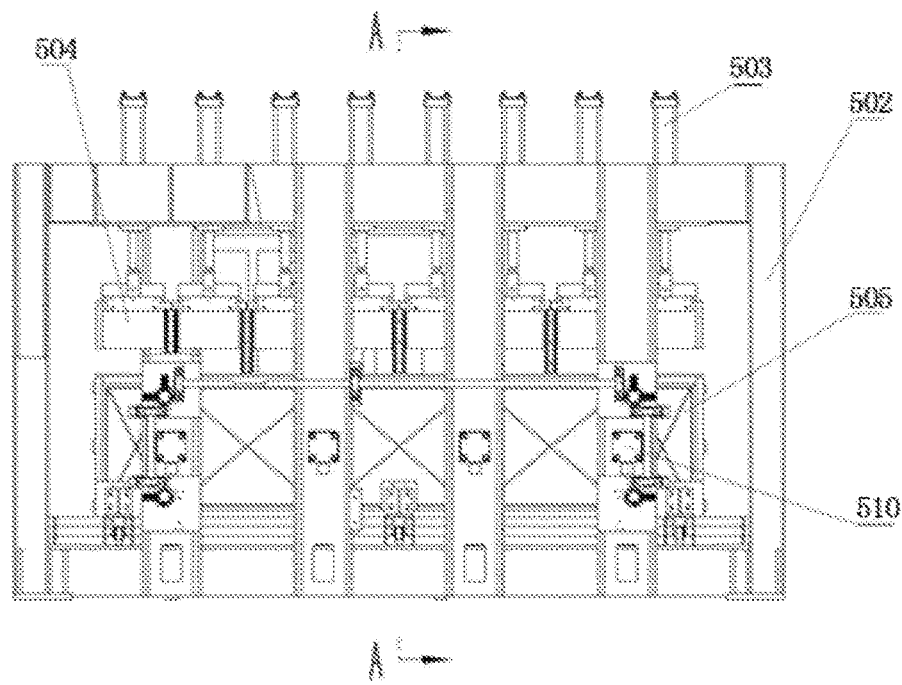
FIG. 17 is a front schematic diagram of a high-frequency press and high-frequency generator system according to an embodiment of the present disclosure.
Figure 18:
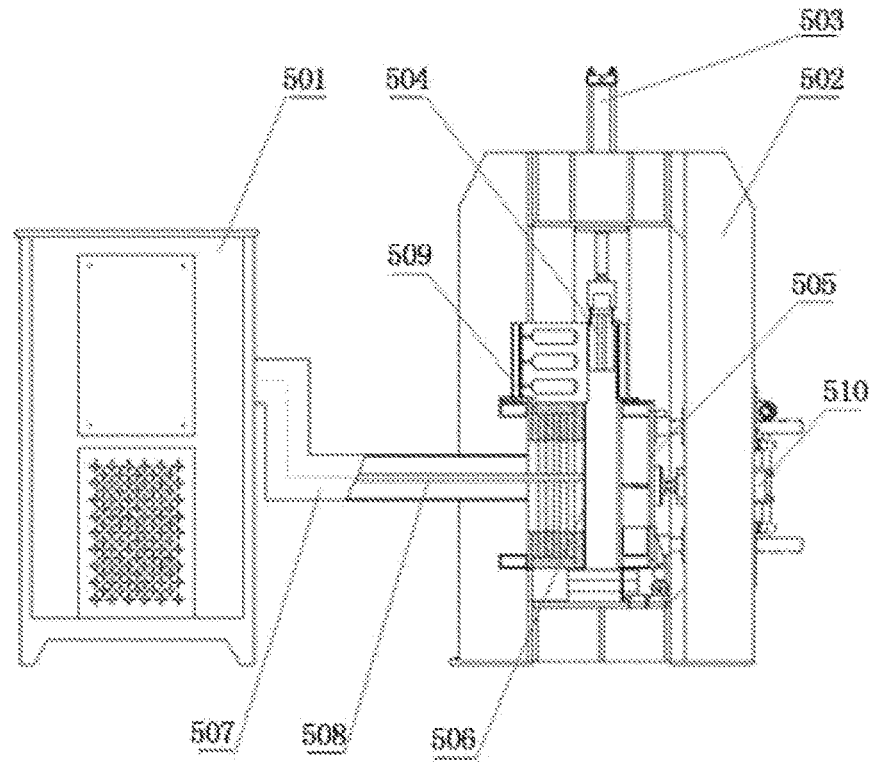
FIG. 18 is a side schematic diagram of a high-frequency press and high-frequency generator system according to an embodiment of the present disclosure.
Figure 19:
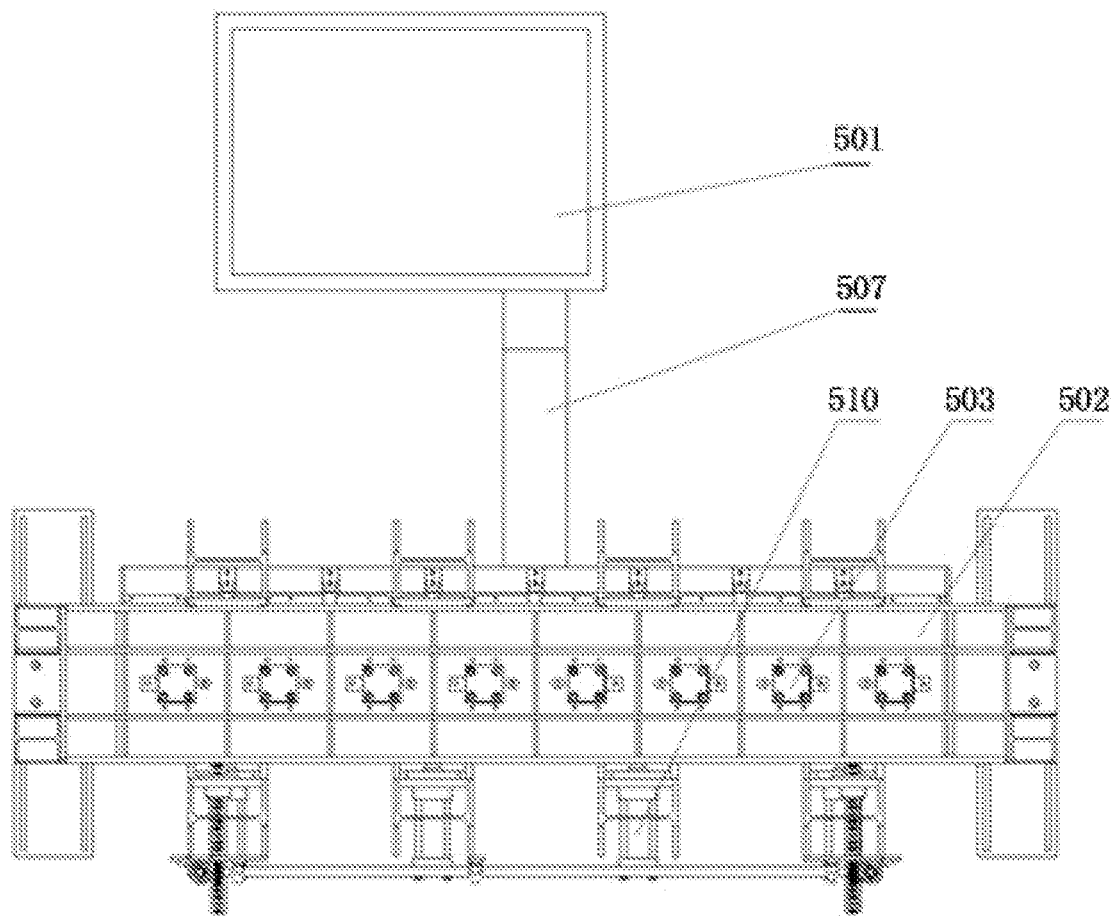
FIG. 19 is a top schematic diagram of a high-frequency press and high-frequency generator system according to an embodiment of the present disclosure.
Figure 20:
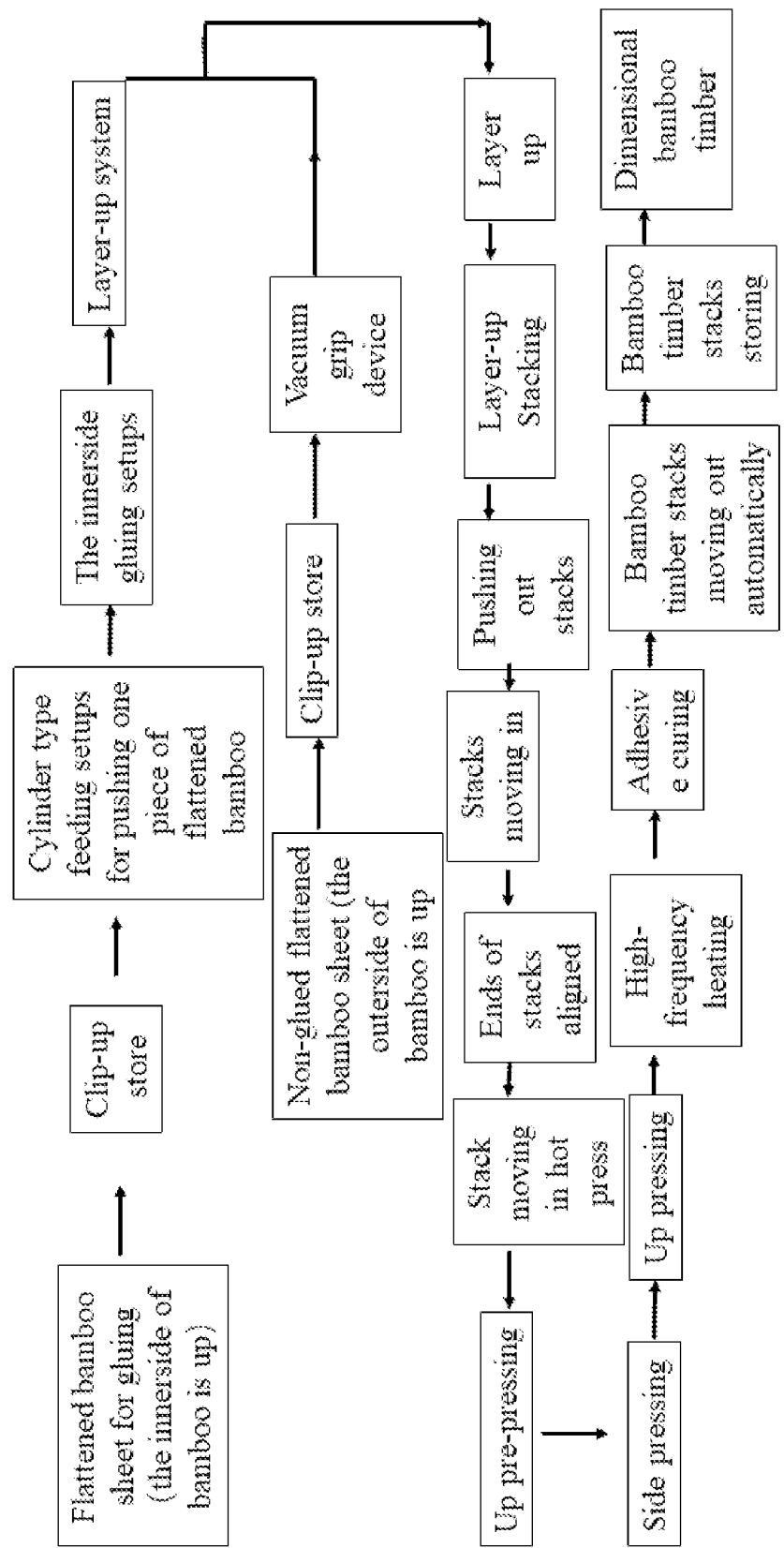
FIG. 20 is a flow diagram of a technological process according to an embodiment of the present disclosure.

The rotating directions of the rollers refer to FIG. 9 that is sectional view taken along line A-A.

As shown in FIG. 4, FIG. 10 to FIG. 13, in other embodiments, system for loading, layer up and stacking non-glued flattened bamboo sheets 3 is located at the rear end of three-roller type gluing system 2.

The system for loading, layer up and stacking non-glued flattened bamboo sheets 3 includes an outerside-of-bamboo loading platform 301, loading-and-unloading-device driving motor 302, vacuum loading system 303, discharging stand 304, clamp type unloading device 305, power transmission roller rack 306, stacking platform 307, conveying-roller-rack driving motor 308, conveying roller rack 309, vacuum generator 310, vacuum chuck 311, vacuum-system lifting cylinder 312, vacuum-loading-system driving motor 313, T-shaped screw rod 314, lifting running wheel 315, cross type lifting supporting arm 316, vacuum-loading-system upper tabletop 317, anti-toppling shafts 318, synchronous belt 319, synchronous-belt wheels 320, chain 321, conveying flat belts 322, stacking-platform driving motors 323, unloading clamp type cylinder 324, and clamp type unloading driving cylinder 325.

Stacking platform 307 is fixed on a left side of conveying roller rack 309. outerside-of-bamboo loading platform 301 is fixed on a right side of the conveying roller rack. Power transmission roller rack 306 is fixed on the conveying roller rack. A plurality of rolling drums 328 are longitudinally provided on power transmission roller rack 306 at intervals. Conveying-roller-rack driving motor 308 is provided at a lower portion of conveying roller rack 309. Transmission chain wheel 327 is fixed on conveying-roller-rack driving motor 308. Two ends of rotating optical shaft 326 with a chain wheel are connected to conveying roller rack 309 through shaft seats. Transmission chain wheel 327 drives the rotating optical shaft to rotate through chain 321 and a chain wheel of the transmission chain. The rotating optical shaft is provided with conveying flat belts 322 that drive the plurality of rolling drums 328 to synchronously rotate. The upper end of conveying roller rack 309 is provided with discharging stand 304. Loading-and-unloading-device driving motor 302 is fixed on a right-side edge of the discharging stand. An output shaft of the loading-and-unloading-device driving motor is fixed with one of synchronous-belt wheels 320. Another synchronous-belt wheel 320 is connected on a left side edge of the discharging stand. Synchronous belt 319 is sleeved between the two synchronous-belt wheels. The discharging stand is slidably fitted with vacuum loading system 303 and clamp type unloading device 305 from right to left at intervals. Synchronous belt 319 drives the vacuum loading system and the clamp type unloading device to move left and right along a lower end of discharging stand 304. Vacuum generator 310 is arranged on the vacuum loading system. A bottom end of the vacuum loading system 303 is provided with vacuum chuck 311. The vacuum loading system is provided with vacuum-system lifting cylinder 312.

Clamp type unloading driving cylinder 325 is fixed on clamp type unloading device 305, and unloading clamp type cylinder 324 is fixed at a bottom end of clamp type unloading device 305.

Vacuum-loading-system driving motor 313 is fixed on one side of the outerside-of-bamboo loading platform 301. The outerside-of-bamboo loading platform is in shaft connection with T-shaped screw rod 314 driven by the vacuum-loading-system driving motor 313. Cross type lifting supporting arm 316 is arranged on the outerside-of-bamboo loading platform. A lower outer side of the cross type lifting supporting arm is in shaft connection with one side edge of the outerside-of-bamboo loading platform. A moving block that is screwed with the T-shaped screw rod is fixed on an inner side of a lower end of the cross type lifting supporting arm. The lower end of the moving block is provided with lifting running wheel 315 capable of running on the outerside-of-bamboo loading platform. Two sides of an upper end of cross type lifting supporting arm 316 are respectively in shaft connection with two sides of a lower end surface of upper tabletop 317 of vacuum loading system. Anti-toppling shafts 318 are fixed on two side edges of the outerside-of-bamboo loading platform 301 at intervals.

Two side edges of upper tabletop 317 which are provided with anti-toppling shafts 318 are provided with a plurality of strip-shaped through holes. Each of upper parts of the various anti-toppling shafts passes through a corresponding one of the strip-shaped through holes.

The structure of stacking platform 307 is the same as the structure of the outerside-of-bamboo loading platform 301, whereas a difference therebetween is that the T-shaped screw rod on stacking platform 307 is driven by another stacking-platform driving motor 323.

Limit baffle plate 329 is provided at an upper end of tail rolling drum 328. Two end sides of the limit baffle plate are fixed on two side edges of power transmission roller rack 306. The limit baffle plate is used to restrain a position where rolling drums conveys the glued bamboo sheet.

During use, the glued dimensional bamboo strip enters the rolling drums of power transmission roller rack 306. Conveying-roller-rack driving motor 308 drives the chain wheel to rotate. By means of transmission of chain 321, rotating optical shaft 326 is driven to rotate. Rotating optical shaft 326 drives conveying flat belts 322 to transmit power to rolling drums 328. Rolling drums 328 rotate to drive the glued dimensional bamboo strip to move forward to a position in front of limit baffle plate 329. A non-glued dimensional bamboo strip is placed on upper tabletop 317 of vacuum loading system above the outerside-of-bamboo loading platform 301. Vacuum-loading-system driving motor 313 drives T-shaped screw rod 314 to rotate to drive lifting running wheel 315 to move forward. In a motion process of lifting running wheel 315, cross type lifting supporting arm 316 drives upper tabletop 317 of the vacuum loading system to move upward to convey the non-glued dimensional bamboo strip to a predetermined position. A piston rod of vacuum-system lifting cylinder 312 extends out to drive vacuum loading system 303 to drop down. Vacuum chuck 311 in vacuum loading system 303 is pressed against the non-glued dimensional bamboo strip. Vacuum generator 310 starts to generate a negative pressure to enable vacuum chuck 311 to firmly suck the non-glued dimensional bamboo strip. The piston rod of vacuum-system lifting cylinder 312 draws back to drive vacuum loading system 303 and the dimensional bamboo strip to rise up to be in place. The loading-and-unloading-device driving motor 302 drives synchronous-belt wheels 320 to rotate to drive the synchronous belt to move; and synchronous belt 319 is enabled to transmit. In this way, vacuum loading system 303 is transversely conveyed to a position above the glued dimensional bamboo strip. The piston rod of vacuum-system lifting cylinder 312 extends out to drive vacuum loading system 303 to drop down, thereby placing a non-glued dimensional bamboo strip onto the glued dimensional bamboo strip. Vacuum generator 310 stops generating the negative pressure, so that vacuum chuck 311 releases the dimensional bamboo strip. In this way, the two-dimensional bamboo strips are adhered to form a piece of bamboo board.

Then, the piston rod of vacuum-system lifting cylinder 312 draws back to drive vacuum loading system 303 and the bamboo board to rise up to be in place. The loading-and-unloading-device driving motor 302 drives synchronous-belt wheel 320 to rotate. By means of transmission of synchronous belt 319, vacuum loading system 303 is transversely conveyed to the original position. Meanwhile, clamp type unloading device 305 is conveyed to a position above the bamboo board (vacuum loading system 303 and clamp type unloading device 305 are driven by the same synchronous belt 319, and positions thereof have been set). The piston rod of clamp type unloading driving cylinder 325 extends out to drive clamp type unloading device 305 to drop to the adhered bamboo board. The piston rod of clamp type unloading driving cylinder 325 draws back to firmly clamp the adhered bamboo board. The piston rod of clamp type unloading driving cylinder 325 draws back to drive clamp type unloading device 305 to rise up to be in place. The loading-and-unloading-device driving motor 302 drives synchronous-belt wheel 320 to rotate. By means of transmission of synchronous belt 319, the clamp type unloading device is transversely conveyed to a position above stacking platform 307. The piston rod of clamp type unloading driving cylinder 325 extends out to drive clamp type unloading device 305 to drop down to be in place. The piston rod of unloading clamp type cylinder 324 extends out to release the adhered bamboo board onto the stacking platform. The piston rod of clamp type unloading driving cylinder 325 draws back to drive clamp type unloading device 305 to rise up to be in place. The above actions are repeated.

Stacking-platform driving motor 323 drives the T-shaped screw rod (located on the stacking platform) to rotate, so as to drive the lifting running wheel to move backward. In the motion process of the lifting running wheel, its cross type lifting supporting arm drives stacking platform 307 to move downward.

The assembled bamboo board is placed on the stacking platform in the system for loading, layer up and stacking non-glued flattened bamboo sheets. The stacking platform with an automatic lifting device automatically lowers one layer, so as to keep an upper plane of the stacking platform and a surface of the glued dimensional bamboo timber on the same plane, where the surface of the dimensional bamboo timbers is glued and located on surfaces of the rolling drums of the power transmission roller rack. Layer-by-layer layer up and lowering are performed in sequence till the assembled bamboo board on the stacking platform achieves a specified height of 600 mm. Later, the arranged bamboo boards on stacking platform 307 are transported onto feeding platform 404 of the plate stack conveying system under the pushing of feeding push head device 401 of the plate stack conveying system. Stacking platform 307 lifts the stacked bamboo boards to the same height as feeding platform 404.

As shown in FIG. 5, FIG. 14 to FIG. 16, in other embodiments, plate stack conveying system 4 is provided. The plate stack conveying system is located on an outer side edge of the system for loading, layer up and stacking non-glued flattened bamboo sheets 3, and is located in front of the high-frequency press and high-frequency generator system.

Plate stack conveying system 4 includes stand supporting column 411, feeding push head device 401, feeding stand 402, feeding chain 403, feeding platform 404, anti-toppling devices 405, feeding motor 406, feeding chain wheel 407, anti-toppling-device bracket 408, alignment cylinder 409, and alignment baffle plate 410.

A lower end of stand supporting column 411 is fixed on the ground on the outer side of the system for loading, layer up and stacking non-glued flattened bamboo sheets 3. An upper outer side of stand supporting column 411 and a front end of feeding stand 402 that is transversely disposed are fixed as a whole. A rear inner side of feeding stand 402 and a rear upper side of feeding platform 404 are fixed as a whole.

A front end of the feeding stand is provided with feeding push head device 401. A front-end surface of the feeding push head device is provided with feeding push plate 413. A front-end surface of the feeding push plate is a rubber surface. Feeding push plate 413 at the front end of the feeding push head device may pass through the stacking platform in the system for loading, layer up and stacking non-glued flattened bamboo sheets 3 (the previous procedure). In this way, the adhered arranged bamboo boards placed on the stacking platform are pushed to be between feeding platform 404 and anti-toppling device 405.

An upper end of feeding push head device 401 is slidably fitted to longitudinal rail wheels located on upper and lower end surfaces of feeding stand 402 through rail wheels 412. There are two groups of rail wheels located at the top and the bottom. The rail wheels are semicircular grooved rail wheels with each a circular cross section. The feeding push head device is slidably fitted to feeding stand 402 through the rail wheels and their respective wheel rails.

An upper end of stand supporting column 411 which is opposite to rail wheels 412 is in shaft connection with feeding chain wheel 407. A rear end of feeding stand 402 which is opposite to the rail wheels is provided with a chain wheel driven by feeding motor 406. Feeding chain wheel 407 and the chain wheel driven by the feeding motor are wound with feeding chain 403. An upper part of feeding push head device 401 is fixed on feeding chain 403 and is driven by feeding chain. Feeding platform 404 is located on the rear inner side of feeding stand 402. An upper end of the feeding platform is provided with anti-toppling devices 405 that are disposed side by side at intervals. Feeding chain 403 is located at an upper end of middle space between the anti-toppling devices that are disposed side by side at intervals. Alignment cylinder 409 is fixed at front ends of anti-toppling devices 405. Alignment baffle plate 410 is arranged on the alignment cylinder.

Feeding motor 406 is fixed on a rear outer side of feeding stand 402.

Bottom ends of anti-toppling devices 405 are fixed on feeding platform 404.

Anti-toppling-device bracket 408 is arranged at middle parts of both feeding platform 404 and the feeding stand, and is used to keep the feeding platform and the feeding stand stable.

During use, the stacked bamboo boards are lifted and transported to the same height as feeding platform 404 by the stacking platform in the system for loading, layer up and stacking non-glued flattened bamboo sheets 3 (in the previous procedure). Feeding motor 406 is initiated. The chain is driven through rotation of the chain wheel to drive feeding push head device 401 to operate from front to back along the feeding stand. The piston rod of alignment cylinder 409 extends out to drive alignment baffle plate 410 to be in place. Feeding push plate 413 of feeding push head device 401 pushes the bamboo boards on the stacking platform to the alignment baffle plate for alignment. The piston rod of alignment cylinder 409 drives the alignment baffle plate to withdraw. Feeding motor 406 is initiated. The chain is driven by rotation of the chain wheel to drive feeding push head device 401 to continue to move backward. After bamboo boards are transported to corresponding positions among anti-toppling devices 405 on feeding platform 404, feeding push head device 401 withdraws and waits for completion of the next stacking. The above actions are repeated till the drying space in the high-frequency press and the high-frequency generator system is emptied. Feeding push head device 401 feeds the bamboo boards as a whole into the high-frequency host in the next procedure for compaction and drying. Anti-toppling devices 405 and anti-toppling-device bracket 408 are mainly used to prevent the stacked bamboo boards from toppling over in feeding and placement states.

As shown in FIG. 1, FIG. 6, and FIG. 17 to FIG. 19, in other embodiments, the high-frequency press and high-frequency generator system 5 includes high-frequency generator 501, high-frequency heating host 502, upper pressing oil cylinders 503, upper pressing push heads 504, lateral pressing push heads 505, positive electrode heating plate 506, high-frequency conveying barrel 507, positive electrode output aluminum-plate 508, positive electrode insulation piece 509, and lateral pressing oil cylinders 510. The high-frequency generator is located outside one side of the middle part of high-frequency heating host 502. High-frequency conveying barrel 507 that is connected with the high-frequency heating host is fixed on high-frequency generator 501. Positive electrode output aluminum-plate 508 is arranged in the high-frequency conveying barrel. Positive electrode heating plate 506 is arranged on one side surface of a lower inner part of high-frequency heating host 502. The positive electrode heating plate is fixed with high-frequency heating host 502 through the positive electrode insulation piece. That is, the inner side of the positive electrode heating plate is fixed in high-frequency heating host 502 through the positive electrode insulation piece. The positive electrode output aluminum-plate is connected with the positive electrode heating plate.

Lateral pressing push heads 505 (a shape thereof is plate shaped) are located on the high-frequency heating host opposite to positive electrode heating plate 506. A portion of high-frequency heating host 502 which is at rear sides of the lateral pressing push heads is provided with lateral pressing oil cylinders 510 for driving the lateral pressing push heads to be close to the positive electrode heating plate. Upper pressing push head 504 (a shape thereof is a slatted shape) is arranged on the high-frequency heating host provided among lateral pressing push heads 505 and positive electrode heating plate 506. Upper pressing oil cylinders 503 for pushing the upper pressing push heads to move downward are fixed on an upper portion of the high-frequency heating host, and are at top ends of upper pressing push heads 504. A flat-surface steel plate is arranged in the high-frequency heating host and is located beneath the lateral pressing push heads and the positive electrode heating plate, so as to form a lower pressing plate. The lower ends of the lateral pressing push heads are slidably fitted with the flat-surface steel plate.

In some optional embodiments, lateral pressing push head 505 is a rectangular steel plate. Lateral pressing oil cylinders 510 that are disposed at intervals are fixed on a portion of high-frequency heating host 502 which is behind the lateral pressing push heads. Ejection rods of the plurality of lateral pressing oil cylinders are fixed at respective middle parts of the rear sides of the lateral pressing push heads.

The shape of the positive electrode heating plate is the same as that of the lateral pressing push head. A sum of lengths of the upper pressing push heads is equal to a length of the positive electrode heating plate or a length of each of the lateral pressing push heads.

In some optional embodiments, upper pressing push heads 505 are a plurality of independent strip-shaped press blocks that are longitudinally connected to each other end to end. The plurality of upper pressing oil cylinders 503 that are disposed at intervals are fixed on a portion of high-frequency heating host 502 which is above middle parts of the various upper pressing push heads. Each of ejection rods of the plurality of pressure applying cylinders is in shaft connection with a middle part of an upper end of a corresponding one of the upper pressing push heads. Each upper pressing push head may swing up and down along a corresponding one of the ejection rods at a swing angle of ±3 degrees.

During use, feeding push plate 413 of feeding push head device 401 pushes assembled bamboo laminated lumber on feeding platform 404 into the high-frequency heating host. The bamboo laminated lumber is located in a space encircled by the lower ends of the upper pressing push heads, lateral pressing push heads 505, positive electrode heating plate 506, and the lower pressing plate.

Lateral pressing oil cylinders 510 drive lateral pressing push heads 505 to be close to positive electrode heating plate 506 to press laterally two sides of the bamboo laminated lumber. Upper pressing oil cylinders 503 drive upper pressing push heads 504 to press the upper sides of the bamboo laminated lumber. When lateral pressing oil cylinders 510 drive lateral pressing push heads 505 to perform pressing, a high frequency is used. Current is transmitted through the positive electrode output aluminum-plate 508 to positive electrode heating plate 506 for high-frequency heating. After the high-frequency heating is completed, lateral pressing oil cylinders 510 drive lateral pressing push heads 505, and upper pressing oil cylinders 503 drives upper pressing push heads 504 to withdraw. Then, the next stack of assembled bamboo laminated lumber is placed, and the heated bamboo laminated lumber is pushed out of high-frequency heating host 502.

The volume of the high-frequency heating host is dimensioned to length times width times height equal to 2600 mm times 100 mm times 600 mm. The positive electrode heating plate and the lateral pressing push heads are high-frequency electrode pressing plates and have positive pressing forces. The lower pressing plate and the positive electrode heating plate are stationary. The lateral pressing push heads and the upper pressing push heads are movable pressing plates. Furthermore, each of the lateral pressing push head has a stroke of 300 mm to 400 mm. During daily working, the stroke is determined according to the width of a dimension flattened bamboo sheet, and is further adjustable. The stroke is adjusted to a degree that facilitates improving the benefits and operations, and also to a degree that prevents the to-be-pressed bamboo laminated lumber from being loosed or staggered left and right. The upper pressing push heads are the independent press blocks. Each strip-shaped press block is driven by an individual upper pressing push head, and is swing up and down at the swing angle of ±3 degrees, which adapts to an accumulated total error of thickness errors of the bamboo strip in the stroke, and ensures the uniform stress on the plate blanks.

The high-frequency heating system has a high-frequency-electrode transmission direction parallel to a glue layer direction, and converts industrial alternating current into a high-frequency electric field through the high-frequency generator.

The high-frequency heating host is a vertical type host, a transverse direction thereof is a width direction of a plate blank (of the to-be-pressed bamboo laminated lumber), and a height direction thereof is a thickness direction of a dimensional bamboo timber that constitutes a plate blank. The four peripheral surfaces of the plate blank of the to-be-pressed bamboo laminated lumber are simultaneously stressed. The lateral pressing forces, which are simultaneously provided by the positive electrode heating plate and the lateral pressing push heads for the plate blanks, converts the industrial alternating current into the high-frequency electric field through the high-frequency generator. The plate blanks of the bamboo laminated lumber are pressed and heated through the upper pressing push heads, the positive electrode heating plate and the lateral pressing push heads. In this way, the glue in the to-be-pressed bamboo laminated lumber is enabled to be quickly cured and molded.

A production method carried out by a high-frequency hot-pressing continuous automatic production line for dimensional bamboo timbers includes the following Steps A to I.

In Step A, the dimensional bamboo timbers are prepared by taking flattened bamboo sheets each having a dimension as a cell, wherein the dimension is determined by length times width times thickness equal to 1050 mm times 75 mm times 6.5 mm.

In Step B, a stack of 60 pieces of the flattened bamboo sheets is put in the clip-up store device of the clip-up store and feeding mechanism in manner of keeping innersides of bamboos upward; a pushing push head is driven by a pushing cylinder to push a bottommost one of the dimensional bamboo strips to move forwards into the three-roller type gluing system for gluing.

In Step C, glue is spread by the three-roller type gluing system by using a roller coating method to uniformly spread the glue to one of the innersides of bamboos which is on an upper surface of the bottommost one of the dimensional bamboo strips by drives of the active rubber roller and the gluing roller, at a gluing amount of 200 g/m$^2$; and a glued surface of the bottommost one of the flattened bamboo sheets is enabled to move in manner of facing upward and enter onto rolling drums of a power transmission roller rack in a system for loading, layer up and stacking non-glued flattened bamboo sheets.

In Step D, another stack of 60 pieces of the flattened bamboo sheets is placed on an upper tabletop of a vacuum loading system in the system for loading, layer up and stacking non-glued flattened bamboo sheets in manner of keeping innersides of bamboos of the stack of the flattened bamboo sheets downward; and a topmost one of the stack of the flattened bamboo sheets is transferred on the upper tabletop of the vacuum loading system by vacuum chucks in the vacuum loading system onto the glued surface of the bottommost one of the flattened bamboo sheets after being glued for layer up.

In Step E, an assembled dimensional-bamboo-timber mat is placed on a stacking platform in the system for loading, layer up and stacking non-glued flattened bamboo sheets; the stacking platform with an automatic lifting device is enabled to automatically descend one layer, so as to keep an upper plane of the stacking platform and a surface (i.e., an outerside of bamboo) of a next bottommost one of the first stack of 60 pieces of the dimensional bamboo sheets on a same plane after being glued, wherein the next bottommost one of the dimensional bamboo sheets is located on the rolling drums of the power transmission roller rack; the layer up is repeated and in turn one layer is descended, till a predetermined height of 600 mm. That the layer up is repeated may be a process repeating Steps C and D.

In Step F, before an assembled mat stack with the height of 600 mm enters the high-frequency press and high-frequency generator system for drying, by the stacking platform in the system for loading, layer up and stacking non-glued flattened bamboo sheets, the assembled mat stack is lifted to a same height as a feeding platform in the plate stack conveying system; an alignment baffle plate is driven by an alignment cylinder in the plate stack conveying system to be in place; the assembled mat stack is pushed on the stacking platform by a feeding push head device to the alignment baffle plate for alignment, such that front ends of mats in the assembled mat stack are ensured to be aligned; and the assembled mat stack is conveyed to a predetermined position of the high-frequency press and high-frequency generator system.

In Step G, the assembled mat stack and another assembled mat stack each having another dimension are pressed, heated and dried in a squeezing and drying space of the high-frequency press and high-frequency generator system having a volume, through upper pressing push heads, a positive electrode heating plate and lateral pressing push heads, wherein the another dimension is determined by length times width times height equal to 1050 mm times 75 mm times 600 mm, the volume is length times width times height equal to 2600 mm times 100 mm times 600 mm; such that the glue in the mats to be pressed is quickly cured and molded, wherein each of the lateral pressing push heads has a stroke of 300 to 400 mm. The squeezing and drying space is a space of the high-frequency press in the high-frequency press and high-frequency generator system; and the volume may be a volume of the high-frequency press.

In Step H, high-frequency heating is performed in a high-frequency press in a condition where a maximum system pressure is 14 MPa, a high-frequency generator has maximum input power of 40 kW, high-frequency maximum oscillation power is 30 kW, heating is conducted for 3 min, and cooling is conducted for 2 min.

In Step I, the assembled mat stack and the another assembled mat stack are pushed out after being heated and cured; an additional stack pushing device is enabled to have rear leaning grids and an upper pressing device, such that the assembled mat stack and the another assembled mat stack are prevented from being loosened or toppling over; the assembled mat stack and the another assembled mat stack are pushed onto a lifting table; and the assembled mat stack and the another assembled mat stack are pushed wholly onto a placement frame for placement when the mats are stacked to a predetermined number.

In at least some preferred embodiments, the layer up is a following process. The topmost one of the stack of the flattened bamboo sheets is transferred on the upper tabletop of the vacuum loading system by the vacuum chucks in the vacuum loading system onto the glued surface of the bottommost one of the flattened bamboo sheets after being glued; the topmost one of the stack of the flattened bamboo sheets and the glued surface are enabled to be assembled into a whole, such that two of the dimensional bamboo timbers which are completely consistent dimensions are assembled into a single one of the mats.

In the present disclosure, unless otherwise clearly defined, the first feature being "above" or "under" the second feature may include that the first and second features are in direct contact, or may include that the first and second features are not in direct contact but in contact through other features between them. Moreover, the first feature being "on", "at the upper side of" and "on the upper surface of" the second feature includes that the first feature is right above and at the oblique upper side of the second feature, or only indicates that the horizontal height of the first feature is greater than that of the second feature. The first feature being "below", "at the lower side of" and "on the lower surface of" the second feature includes that the first feature is right below and at the oblique lower side of the second feature, or only indicates that the horizontal height of the first feature is less than that of the second feature.

The above shows and describes the basic principles, main features and advantages of the present disclosure. Those skilled in the art should understand that the present disclosure is not limited by the foregoing embodiments. Those examples described in the foregoing embodiments and the specification are only preferred examples of the present disclosure and are not intended to limit the present disclosure. The present disclosure may have various changes and improvements without departing from the spirit and scope of the present disclosure, and these changes and improvements all fall within the scope claimed by the present disclosure. The scope claimed by the present disclosure is defined by the appended claims and their equivalents.

What is claimed is:

1. A high-frequency hot-pressing continuous automatic production line for dimensional bamboo timbers comprising:
    a clip-up store and feeding mechanism, wherein the clip-up store and feeding mechanism is fixed with a first end of a three-roller type gluing system;
    wherein an other end of the three-roller type gluing system is fixed with an end t of a system for loading, layer up and stacking non-glued flattened bamboo sheets;
    wherein an outer side edge of the system for loading, layer up and stacking non-glued flattened bamboo sheets is connected to a front inner end of a plate stack conveying system; and
    wherein a high-frequency press and high-frequency generator system is located at a rear end of the plate stack conveying system;
wherein the clip-up store and feeding mechanism comprises:
    a pushing cylinder;
    a pushing stand;
    a pushing push head;
    a plurality of stop pillars; and
    a single-piece discharging baffle plate;
    wherein the pushing cylinder is fixed on a rear part of the pushing stand;
    wherein an end of the pushing cylinder is fixed with the pushing push head;
    wherein the clip-up store and feeding mechanism is fixed on the pushing stand;
    wherein an end part of the pushing stand is fixed with the single-piece discharging baffle plate;
    wherein the pushing stand is a flat-plate type pushing stand:
    wherein a lower end of the pushing stand is provided with a first supporting leg and a second supporting leg;
    wherein a lower end of the first supporting leg is fixed to a middle part of a first horizontal leveling plate, and the second supporting leg is fixed to a middle part of a second horizontal leveling plate;
    wherein two ends of each of the first horizontal leveling plate and the second horizontal leveling plate are screwed with leveling bolts;
    wherein the clip-up store and feeding mechanism is located at an upper part of the pushing stand;
    wherein the plurality of stop pillars are arranged side by side on two side edges of the clip-up store and feeding mechanism at intervals;
    wherein a width between transversely adjacent two of the stop pillars is greater than a width of each of dimensional bamboo strips by 1 to 2 mm; each of the stop pillars has a height of 0.6 m to 0.8 m; and
    wherein a bottom of the clip-up store and feeding mechanism is half opened.

2. The high-frequency hot-pressing continuous automatic production line for the dimensional bamboo timbers according to claim 1, wherein the three-roller type gluing system comprises:
    a driving motor;
    a driving motor decelerator;
    an active rubber roller;
    a plurality of workpiece height adjustment devices;
    a gluing roller;
    a plurality of glue placement regions;
    a glue amount adjustment roller;
    a plurality of gluing amount adjustment devices;
    a glue collection box;
    a chain leaning wheel;
    a chain tensioning wheel;
    a tensioning spring; and
    a transmission chain;
    wherein one side of a stand is provided with the driving motor;
    wherein the driving motor decelerator is fixed on the driving motor;
    wherein an output end of the driving motor drives an input end of the driving motor decelerator;
    wherein an output end of the driving motor decelerator drives one end of a center shaft of the active rubber roller located at an inner lower part of the stand;
    wherein the center shaft of the active rubber roller is connected to the stand through a bearing;
    wherein an other end of the center shaft of the active rubber roller is located outside the stand and fixed with a transmission chain wheel;
    wherein an inside of a portion of the stand which is above the active rubber roller is provided with the gluing roller;
    wherein a portion of the stand which is at two sides of the gluing roller is provided with the workpiece height adjustment devices;
    wherein a center shaft that is penetrated through two sides of the gluing roller is in shaft connection with the stand by the workpiece height adjustment devices;
    wherein the glue amount adjustment roller is located on an upper portion of the stand which is opposite to the gluing roller;
    wherein a portion of the stand which is at two sides of the glue amount adjustment roller is provided with the gluing amount adjustment devices capable of adjusting a distance between the glue amount adjustment roller and the gluing roller;
    wherein the two sides of the glue amount adjustment roller are in shaft connection with the stand by the gluing amount adjustment devices;
    wherein the glue placement regions are provided on two side portions of the stand which are above the gluing roller and the glue amount adjustment roller;
    wherein the glue collection box is placed in a portion of the stand which is beneath the active rubber roller and the glue amount adjustment roller;

wherein the center shaft of the gluing roller and a center shaft of the glue amount adjustment roller which are outside the stand are fixed with each one transmission chain wheel wherein;

wherein the center shaft of the gluing roller and the center shaft of the glue amount adjustment roller are corresponding to the transmission chain wheel of the center shaft of the active rubber roller;

wherein the transmission chain wheel of the gluing roller, the transmission chain wheel of the glue amount adjustment roller, and the transmission chain wheel of the active rubber roller are each wound with the transmission chain;

wherein the transmission chain is further wound on the chain leaning wheel and the chain tensioning wheel located on the stand; the chain tensioning wheel presses against the transmission chain through the tensioning spring; and wherein a surface of the gluing roller is a ring-ripple rubber surface.

3. The high-frequency hot-pressing continuous automatic production line for the dimensional bamboo timbers according to claim 2, further comprising a plurality of close plate blocks, wherein two sides of the stand, where the workpiece height adjustment devices are corresponding to the gluing roller, are provided with a plurality of respective opened sliding chutes each having an upward opening;

wherein a middle part of each of the plurality of close plate blocks is screwed with a corresponding one of a plurality of respective lifting screws; each of the plurality of the close plate blocks closes the upward opening of each of the plurality of respective opened sliding chutes and is fixed with the stand as a whole;

wherein two ends of each of sliding blocks are slidably fitted in a corresponding one of the plurality of respective opened sliding chutes;

wherein a middle part of each of the sliding blocks is provided with a corresponding one of a plurality of respective bearing holes;

wherein an upper part of each of the sliding blocks is in shaft connection with a lower end of a corresponding one of the plurality of respective lifting screws;

wherein an upper end of each of the plurality of respective lifting screws is fixed with a turntable; and wherein the center shaft that is penetrated through the two sides of the gluing roller is arranged in a corresponding one of the plurality of respective bearing holes of the sliding blocks.

4. The high-frequency hot-pressing continuous automatic production line for the dimensional bamboo timbers according to claim 1, wherein the system for loading, layer up and stacking non-glued flattened bamboo sheets comprises:

an outerside-of-bamboo loading platform;
a loading-and-unloading-device driving motor;
a vacuum loading system;
a discharging stand;
a clamp type unloading device;
a power transmission roller rack;
a stacking platform;
a conveying-roller-rack driving motor;
a conveying roller rack;
a vacuum generator;
a vacuum chuck;
a vacuum-system lifting cylinder;
a vacuum-loading-system driving motor;
a T-shaped screw rod;
a lifting running wheel;
a cross type lifting supporting arm;
a vacuum-loading-system upper tabletop;
a plurality of anti-toppling shafts;
a synchronous belt;
two synchronous-belt wheels;
a chain;
a plurality of conveying flat belts;
a plurality of stacking-platform driving motors;
an unloading clamp type cylinder; and
a clamp type unloading driving cylinder;

wherein the stacking platform is fixed on a left side of the conveying roller rack;

wherein the outerside-of-bamboo loading platform is fixed on a right side of the conveying roller rack; the power transmission roller rack is fixed on the conveying roller rack;

wherein a plurality of rolling drums is longitudinally provided on the power transmission roller rack at intervals;

wherein the conveying-roller-rack driving motor is provided a lower portion of the conveying roller rack;

wherein a transmission chain wheel is fixed on the conveying-roller-rack driving motor;

wherein two ends of a rotating optical shaft with a chain wheel are connected to the conveying roller rack through shaft seats;

wherein the transmission chain wheel drives the rotating optical shaft to rotate through the chain and a chain wheel of the transmission chain;

wherein the rotating optical shaft is provided with the conveying flat belts for driving the plurality of rolling drums to synchronously rotate;

wherein an upper end of the conveying roller rack is provided with the discharging stand;

wherein the loading-and-unloading-device driving motor is fixed on a right-side edge of the discharging stand;

wherein an output shaft of the loading-and-unloading-device driving motor is fixed with one of the two synchronous-belt wheels;

wherein another one of the two synchronous-belt wheels is connected on a left side edge of the discharging stand;

wherein the synchronous belt is sleeved between the two synchronous-belt wheels;

wherein the discharging stand is slidably fitted with the vacuum loading system and the clamp type unloading device from right to left at intervals;

wherein the synchronous belt drives the vacuum loading system and the clamp type unloading device to move left and right along a lower end of the discharging stand;

wherein the vacuum generator is arranged on the vacuum loading system;

wherein a bottom end of the vacuum loading system is provided with the vacuum chuck;

wherein the vacuum loading system is provided with the vacuum-system lifting cylinder;

wherein the clamp type unloading driving cylinder is fixed on the clamp type unloading device and the unloading clamp type cylinder is fixed at a bottom end of the clamp type unloading device;

wherein the vacuum-loading-system driving motor is fixed on one side of the outerside-of-bamboo loading platform;

wherein the outerside-of-bamboo loading platform is in shaft connection with the T-shaped screw rod driven by the vacuum-loading-system driving motor;

wherein the cross type lifting supporting arm is arranged on the outerside-of-bamboo loading platform; a lower outer side of the cross type lifting supporting arm is in shaft connection with one side edge of the outerside-of-bamboo loading platform; a moving block that is screwed with the T-shaped screw rod is fixed on an inner side of a lower end of the cross type lifting supporting arm;

wherein a lower end of the moving block is provided with a said lifting running wheel capable of running on the outerside-of-bamboo loading platform;

wherein two sides of an upper end of the cross type lifting supporting arm are respectively in shaft connection with two sides of a lower end surface of the vacuum-loading-system upper tabletop;

wherein the anti-toppling shafts are fixed on two side edges of the outerside-of-bamboo loading platform at intervals;

wherein two side edges of the vacuum-loading-system upper tabletop which are provided with the anti-toppling shafts are provided with a plurality of strip-shaped through holes and each of upper parts of the anti-toppling shafts passes through a corresponding one of the strip-shaped through holes; and wherein a limit baffle plate is provided at an upper end of a tail one of the rolling drums.

5. The high-frequency hot-pressing continuous automatic production line for the dimensional bamboo timbers according to claim 1, wherein the plate stack conveying system comprises:

a feeding push head device;
a feeding stand;
a feeding chain;
a feeding platform;
a plurality of anti-toppling devices;
a feeding motor;
a feeding chain wheel;
an anti-toppling-device bracket;
an alignment cylinder; and
an alignment baffle plate;

wherein an upper outer side of a stand supporting column and a front end of the feeding stand that is transversely disposed are fixed with each other as a whole;

wherein a rear inner side of the feeding stand and a rear upper side of the feeding platform are fixed with each other as a whole;

wherein a front end of the feeding stand is provided with the feeding push head device;

wherein an upper end of the feeding push head device is slidably fitted to longitudinal rail wheels located on upper and lower end surfaces of the feeding stand through rail wheels;

wherein an upper end of the stand supporting column which is opposite to the rail wheels is in shaft connection with the feeding chain wheel;

wherein a rear end of the feeding stand which is opposite to the rail wheels is provided with a chain wheel driven by the feeding motor;

wherein the feeding chain wheel and the chain wheel that is driven by the feeding motor are wound with the feeding chain;

wherein an upper part of the feeding push head device is fixed on the feeding chain and is driven by the feeding chain;

wherein the feeding platform is located on the rear inner side of the feeding stand;

wherein an upper end of the feeding platform is provided with the plurality of anti-toppling devices that are disposed side by side at intervals;

wherein the feeding chain is located at an upper portion of middle space between the plurality of anti-toppling devices that are disposed side by side at intervals;

wherein the alignment cylinder is fixed at front ends of the plurality of anti-toppling devices and the alignment baffle plate is arranged on the alignment cylinder;

wherein the rail wheels are each a semicircular grooved rail wheel, and have each a circular cross section;

wherein the feeding motor is fixed on a rear outer side of the feeding stand;

wherein a bottom end of each of the plurality of anti-toppling devices is fixed on the feeding platform;

wherein a front-end surface of the feeding push head device is provided with a feeding push plate, and a front end surface of the feeding push plate is a rubber surface; and wherein the anti-toppling-device bracket is arranged at middle parts of both the feeding platform and the feeding stand.

6. The high-frequency hot-pressing continuous automatic production line for the dimensional bamboo timbers according to claim 1, wherein the high-frequency press and high-frequency generator system comprises:

a high-frequency generator;
a high-frequency heating host;
a plurality of upper pressing oil cylinders;
a plurality of upper pressing push heads;
a plurality of lateral pressing push heads;
a positive electrode heating plate;
a high-frequency conveying barrel;
a positive electrode output aluminum-plate;
a positive electrode insulation piece; and
a plurality of lateral pressing oil cylinders;

wherein the high-frequency conveying barrel is fixed on the high-frequency generator;

wherein the positive electrode output aluminum-plate is arranged in the high-frequency conveying barrel; the positive electrode heating plate is arranged on one side surface of a lower inner part of the high-frequency heating host;

wherein the positive electrode heating plate is fixed with the high-frequency heating host through the positive electrode insulation piece;

wherein the positive electrode output aluminum-plate is connected with the positive electrode heating plate;

wherein the plurality of lateral pressing push heads are located on the high-frequency 6heating host opposite to the positive electrode heating plate;

wherein a portion of the high-frequency heating host which is at rear sides of the plurality of lateral pressing push heads is provided with the lateral pressing oil cylinders for driving the plurality of lateral pressing push heads to be close to the positive electrode heating plate;

wherein the high-frequency heating host is provided among the plurality of lateral pressing push heads and the positive electrode heating plate, and provided with the plurality of upper pressing push heads and the plurality of upper pressing oil cylinders for pushing the plurality of upper pressing push heads to move downward are fixed on an upper portion of the high-frequency heating host, and are at top ends of the plurality of upper pressing push heads;

wherein each of the plurality of lateral pressing push heads is a rectangular steel plate;

wherein the plurality of lateral pressing oil cylinders that are disposed at intervals are fixed on a portion of the high-frequency heating host which is behind the plurality of lateral pressing push heads;

wherein ejection rods of the plurality of lateral pressing oil cylinders are fixed at respective middle parts of rear sides of the plurality of lateral pressing push heads;

wherein the positive electrode heating plate has a same shape as the plurality of lateral pressing push head; and wherein a sum of lengths of the plurality of upper pressing push heads is equal to a length of the positive electrode heating plate or a length of each of the plurality of lateral pressing push heads.

7. The high-frequency hot-pressing continuous automatic production line for the dimensional bamboo timbers according to claim 6,
wherein the plurality of upper pressing push heads are a plurality of independent strip-shaped press blocks that are longitudinally connected with each other end to end;
wherein the plurality of upper pressing oil cylinders that are disposed at intervals are fixed on a portion of the high-frequency heating host which is above middle parts of the plurality of upper pressing push heads;
wherein each of ejection rods of the plurality of upper pressing oil cylinders is in shaft connection with a middle part of an upper end of a corresponding one of the plurality of upper pressing push heads; and
wherein each of the plurality of upper pressing push heads is swung up and down along a corresponding one of the ejection rods at a swing angle of ±3 degrees.

* * * * *